US012656237B2

(12) United States Patent
Misawa

(10) Patent No.: US 12,656,237 B2
(45) Date of Patent: Jun. 16, 2026

(54) SHADOW IMAGE AND SCATTERED INTENSITY FOR PARTICLE MEASURING APPARATUS AND PARTICLE MEASURING METHOD

(71) Applicant: Hitachi, Ltd., Tokyo (JP)

(72) Inventor: Tomonari Misawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 137 days.

(21) Appl. No.: 18/556,016

(22) PCT Filed: Jun. 27, 2022

(86) PCT No.: PCT/JP2022/025450
§ 371 (c)(1),
(2) Date: Oct. 18, 2023

(87) PCT Pub. No.: WO2023/282101
PCT Pub. Date: Jan. 12, 2023

(65) Prior Publication Data
US 2024/0385098 A1 Nov. 21, 2024

(30) Foreign Application Priority Data

Jul. 9, 2021 (JP) ................................. 2021-114557

(51) Int. Cl.
*G01N 15/00* (2024.01)
*G01N 15/0205* (2024.01)
*G01N 15/0227* (2024.01)

(52) U.S. Cl.
CPC ..... *G01N 15/0211* (2013.01); *G01N 15/0227* (2013.01)

(58) Field of Classification Search
CPC ........... G01N 15/0211; G01N 15/0227; G01N 2015/144; G01N 2015/1486;
(Continued)

(56) References Cited

U.S. PATENT DOCUMENTS

2007/0165225 A1 7/2007 Trainer
2020/0326267 A1* 10/2020 Misawa ............. G01N 15/1433

FOREIGN PATENT DOCUMENTS

CN 206132564 U 4/2017
JP 2003-121337 A 4/2003
(Continued)

OTHER PUBLICATIONS

Lufang Guo, Jianqi Shen, Dependence of the forward light scattering on the refractive index of particles, Optics & Laser Technology, vol. 101, May 2018, pp. 232-241 (Year: 2018).*
(Continued)

*Primary Examiner* — Rebecca C Bryant
(74) *Attorney, Agent, or Firm* — Volpe Koenig

(57) ABSTRACT

Particle size measurement and material discrimination can be performed simultaneously with a less expensive configuration. A particle measuring apparatus includes: a first light source and a second light source that irradiate a sample containing particles of a predetermined material with parallel light; an imaging unit that captures a scattered light image of the particles by the parallel light emitted from the first light source, and a shadow image of the particles by the parallel light emitted from the second light source; and an image processing unit that performs material discrimination of the particles based on correspondence between scattered light intensity of the particles specified based on the scattered light image and a shadow size of the particles specified based on the shadow image, and a theoretical correlation curve showing a theoretical value of the correspondence of the particles, and calculates a particle size of the particles.

20 Claims, 16 Drawing Sheets

(58) Field of Classification Search
CPC ....... G01N 2015/1493; G01N 15/1433; G01N
15/1434; G01N 2015/0294; G01N
2015/1497
See application file for complete search history.

(56) References Cited

FOREIGN PATENT DOCUMENTS

| | | | |
|----|--------------|----|---------|
| JP | 2004-177257  | A  | 6/2004  |
| JP | 2007-527997  | A  | 10/2007 |
| JP | 2017138330   | A  | 8/2017  |
| JP | 2020-173244  | A  | 10/2020 |
| WO | 2020/096038  | A1 | 5/2020  |

OTHER PUBLICATIONS

International Search Report, PCT/JP2022/025450, Aug. 23, 2022.
Chinese Office Action issued on Apr. 13, 2026 for Chinese Patent
Application No. 202280031890.5.
Tkacik et al., "Sizing of Airborne Particles in an Operating Room",
Retrieved from the Internet URL <https://doi.org/10.1371/journal.
pone.0249587>, Apr. 5, 2021, 21 pages.

* cited by examiner

[FIG. 1]
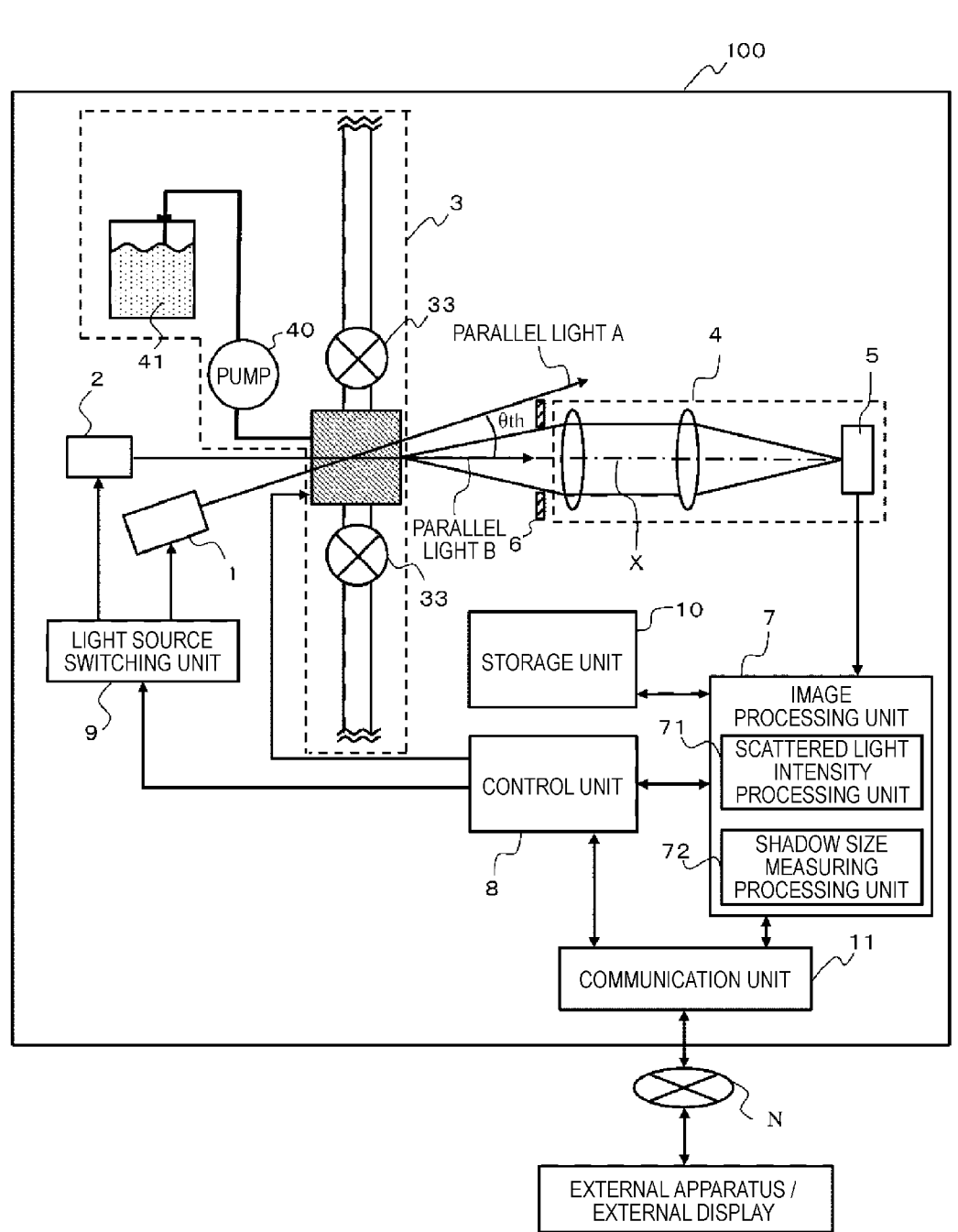

[FIG. 2]
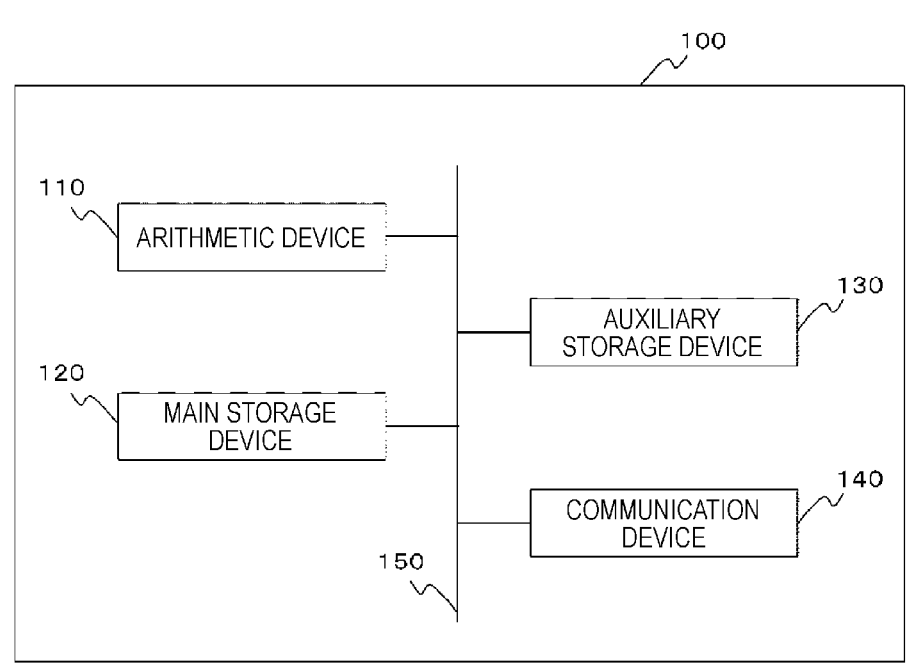

[FIG. 3]
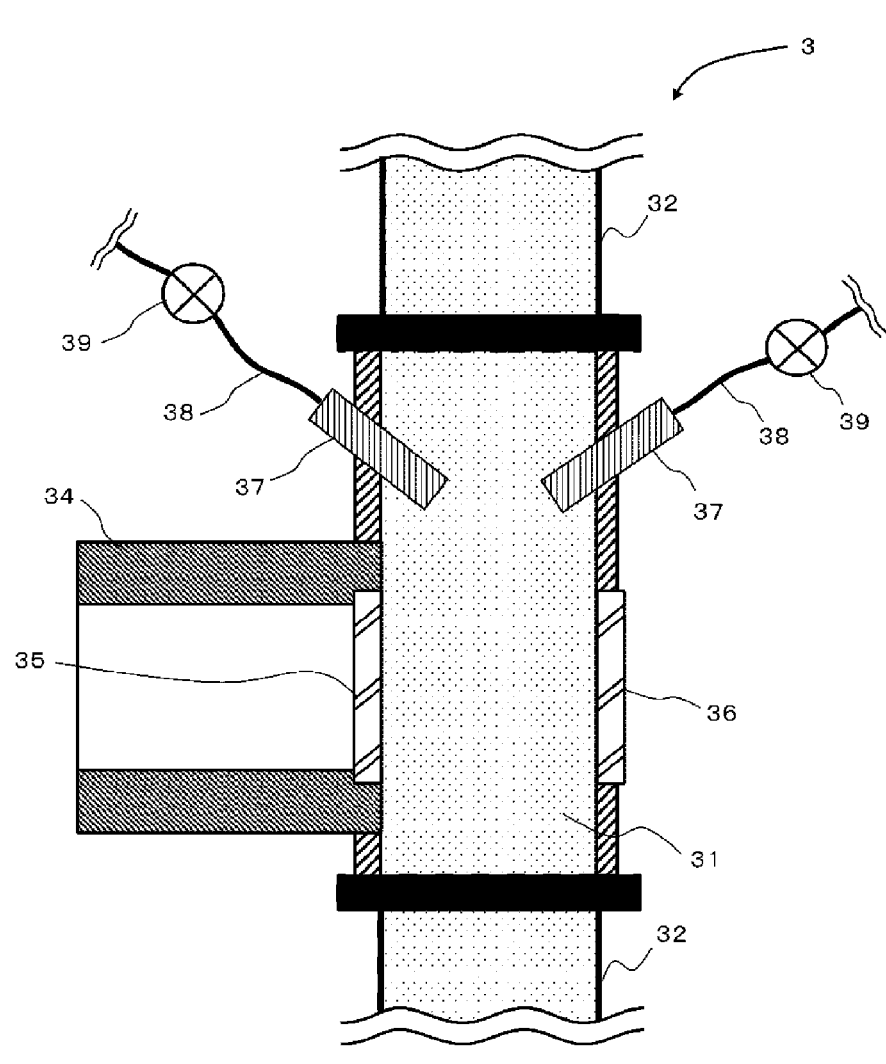

[FIG. 4]
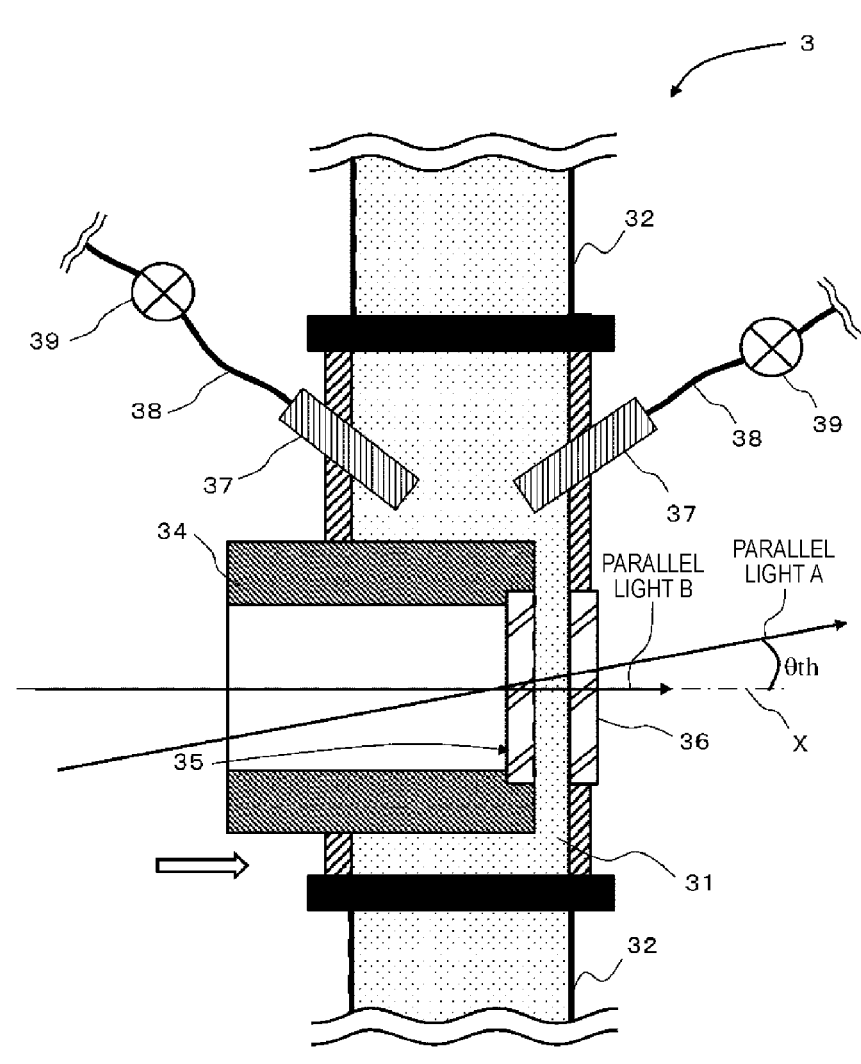

[FIG. 6]
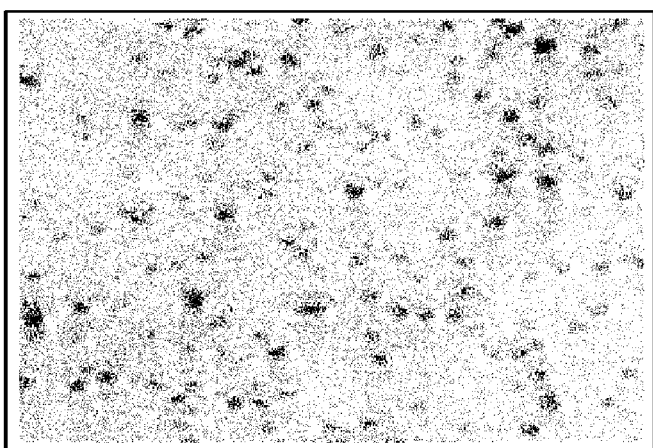

[FIG. 7]
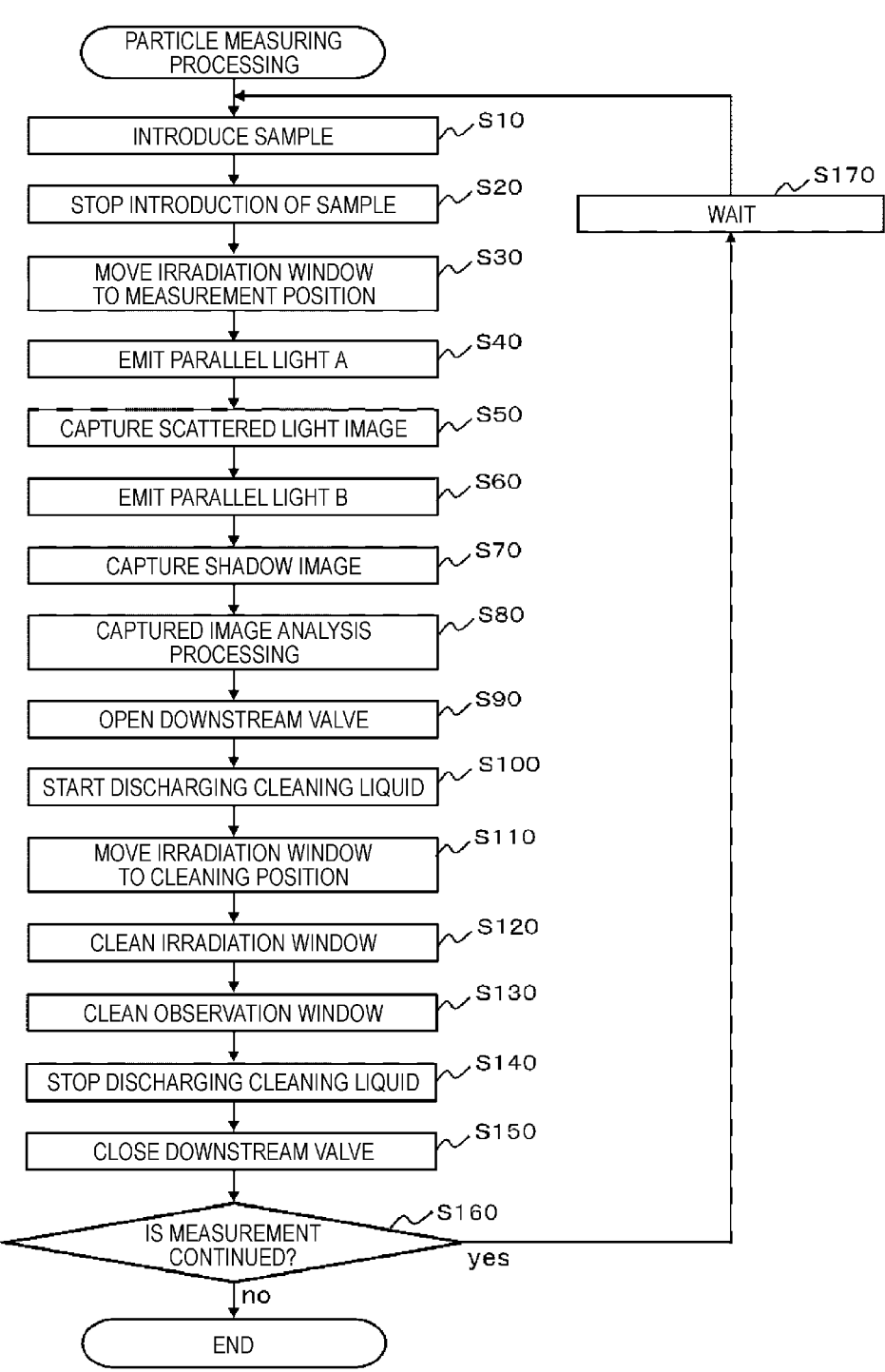

[FIG. 8]
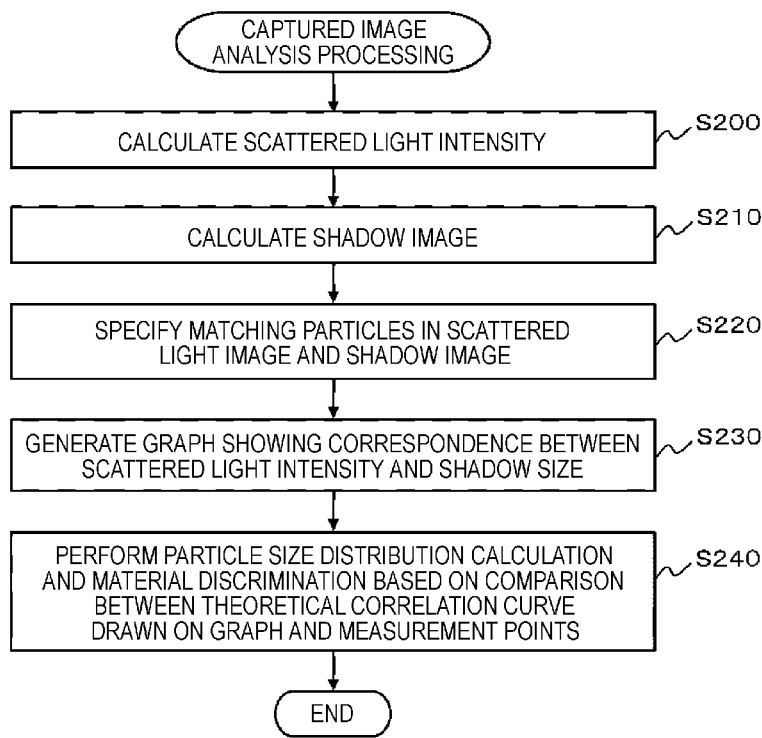

FIG. 9A
SCATTERING ANGLE 10°
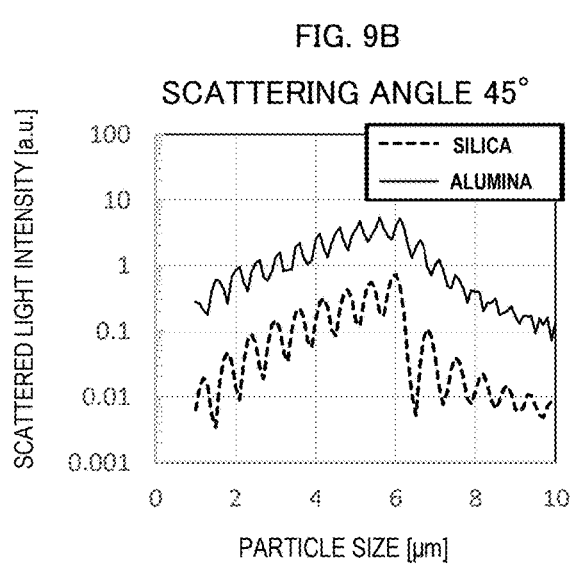
FIG. 9B
SCATTERING ANGLE 45°
FIG. 9C
SCATTERING ANGLE 90°
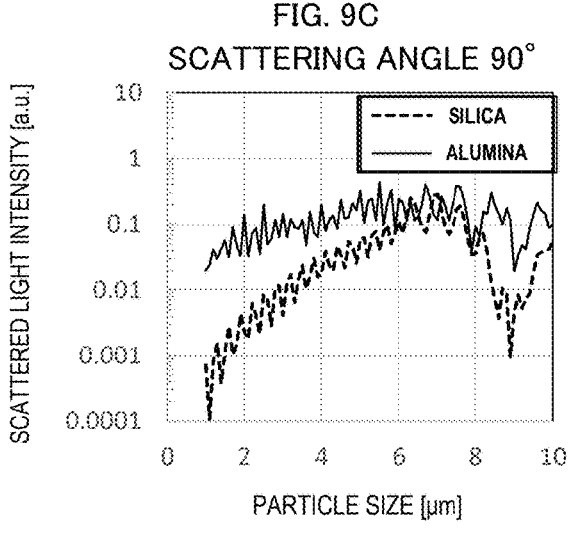
FIG. 9D
SCATTERING ANGLE 170°
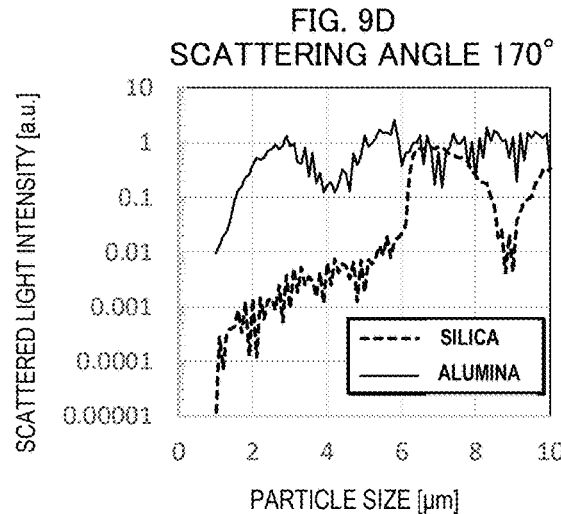

[FIG. 10]
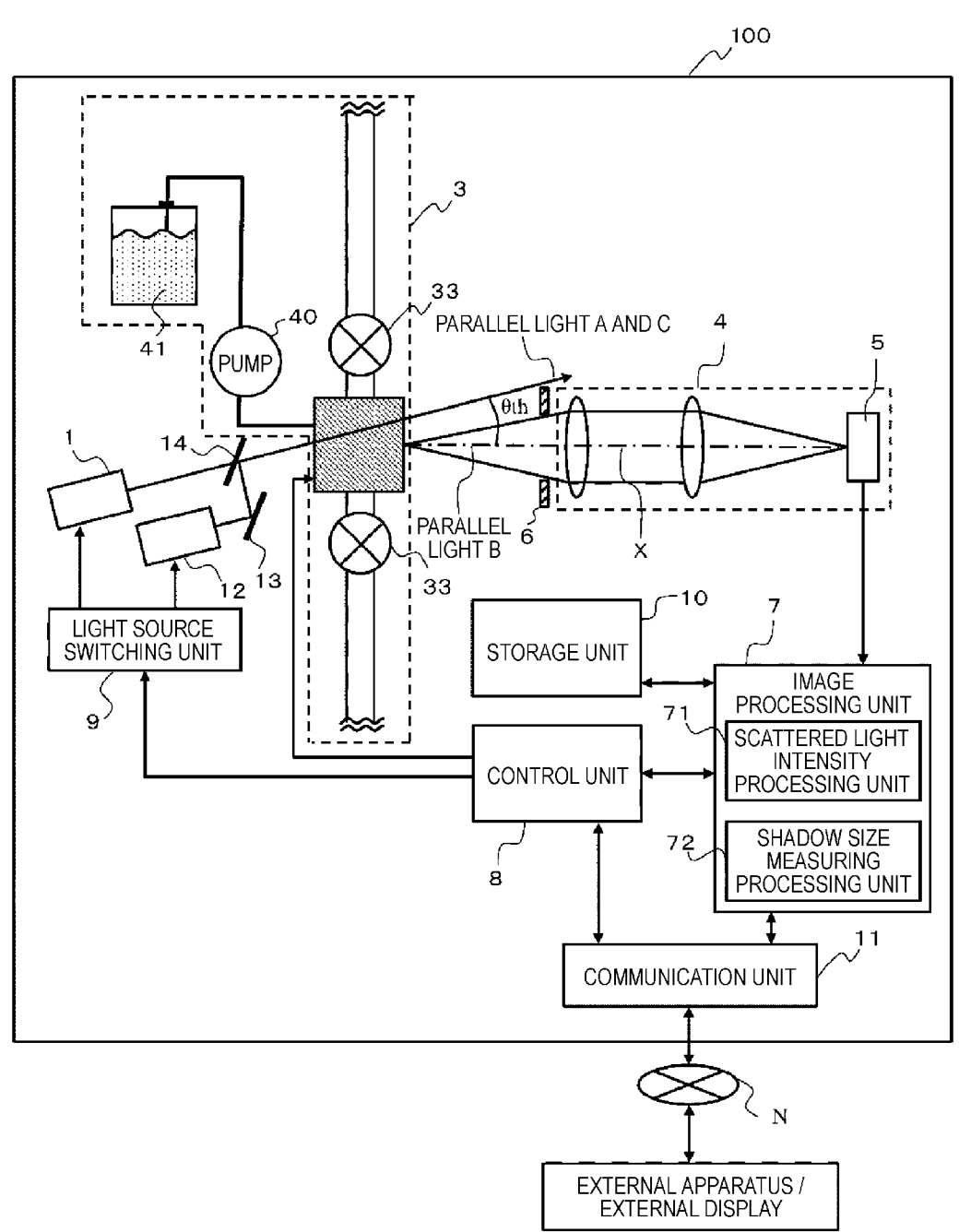

[FIG. 11]
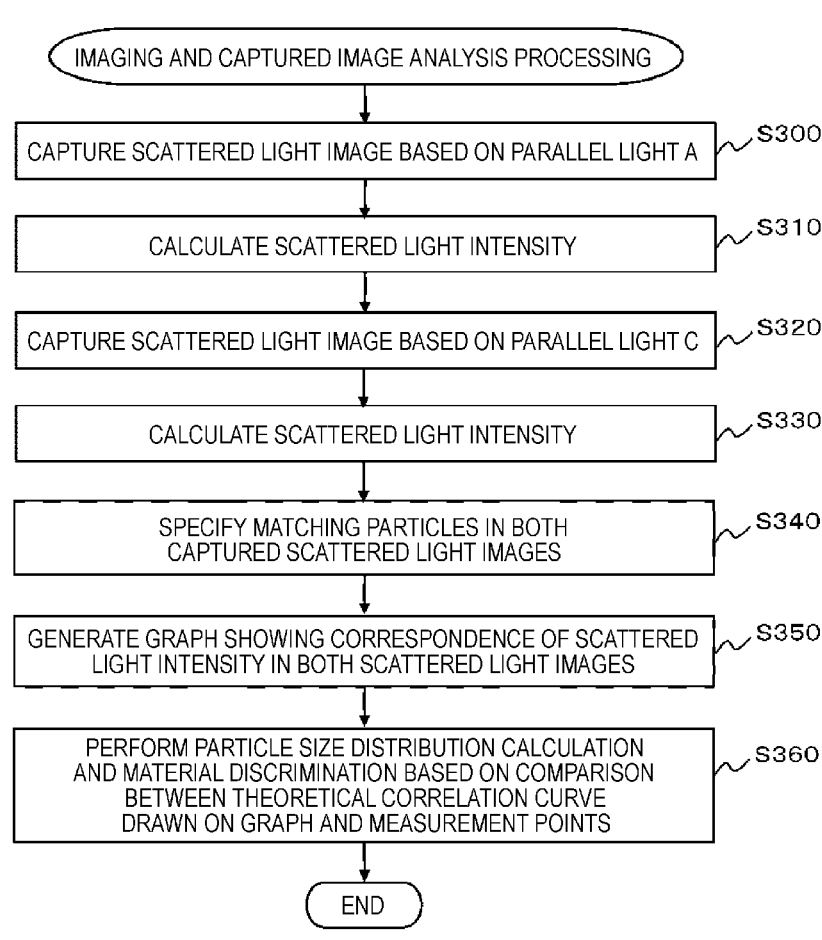

SCATTERING ANGLE 5°

SCATTERING ANGLE 10°

(c) SCATTERING ANGLE 20°

(d) SCATTERING ANGLE 45°

SCATTERING ANGLE 90°

SCATTERING ANGLE 170°

[FIG. 14]
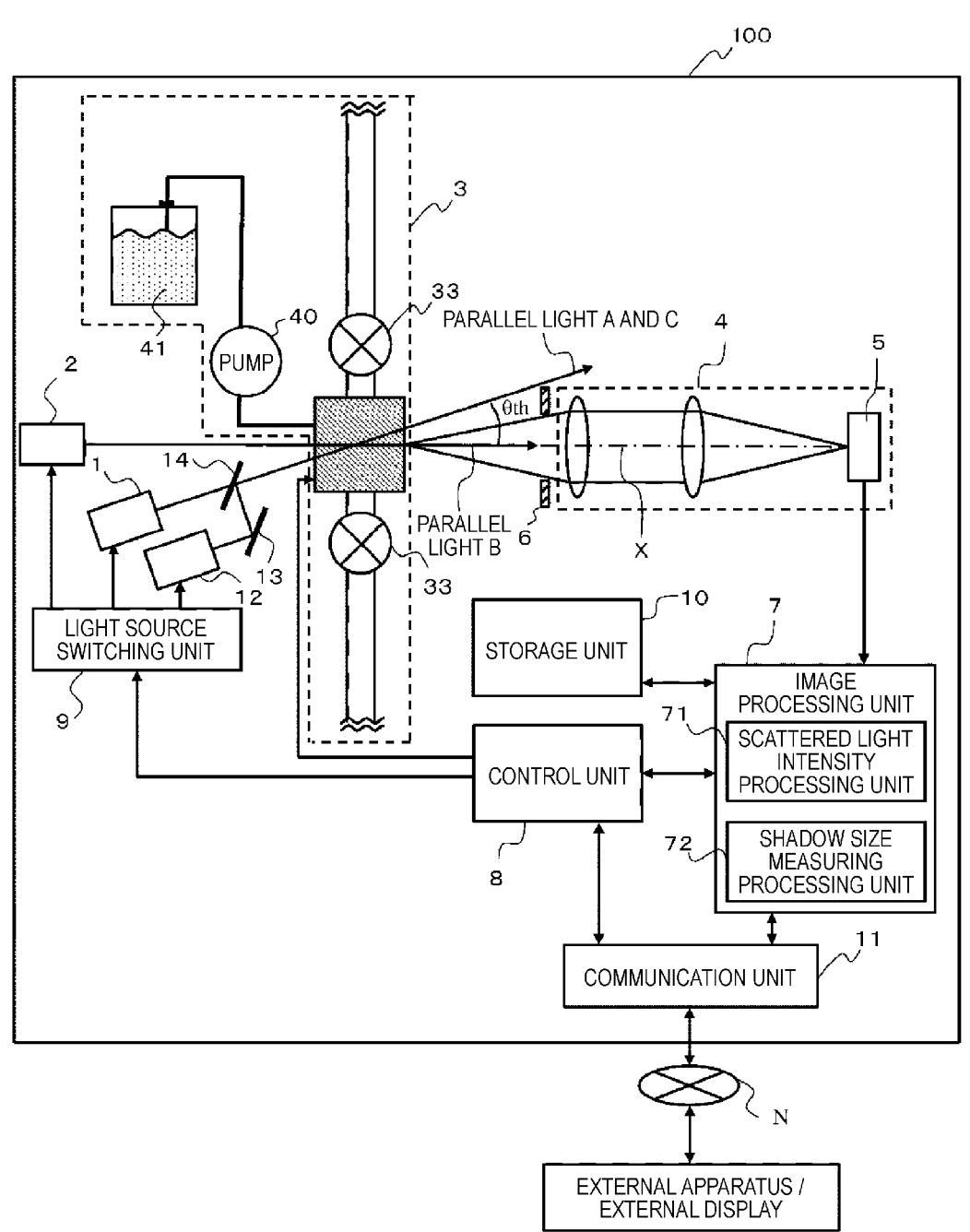

[FIG. 15]
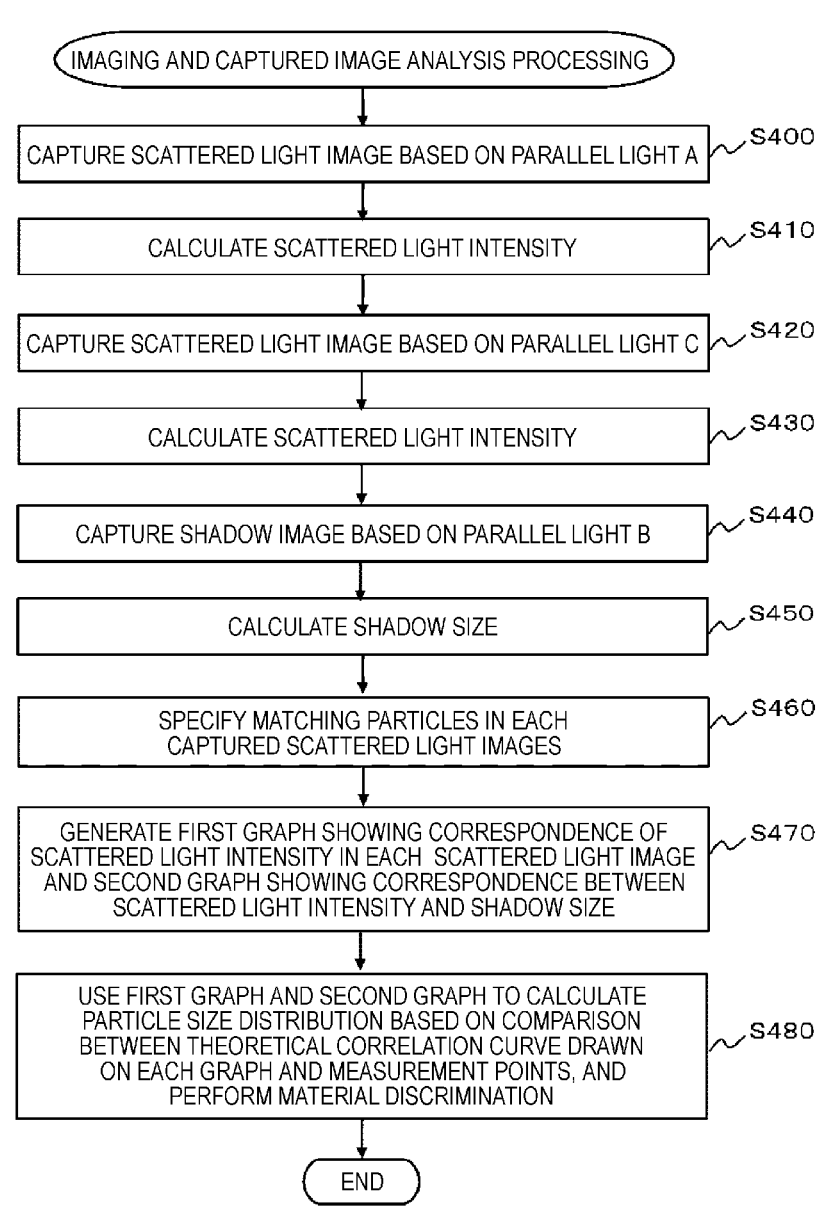

[FIG. 16]
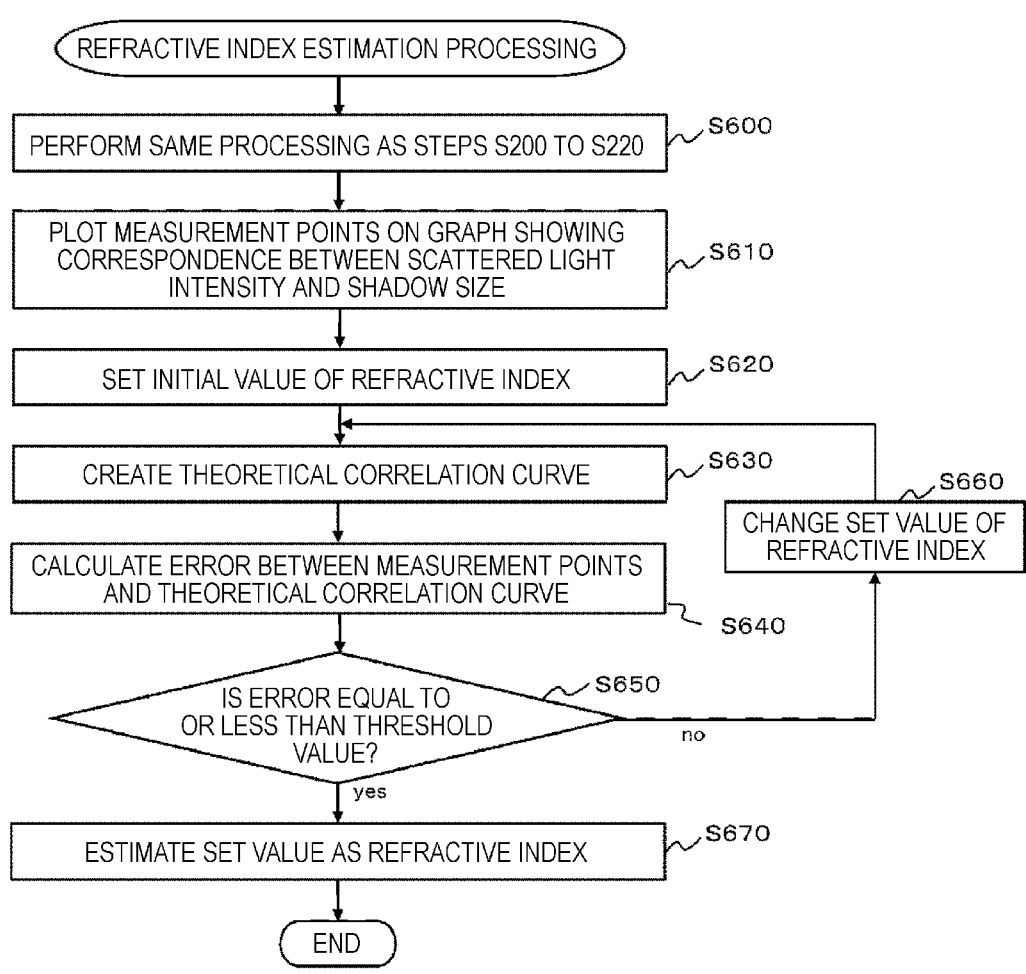

SHADOW IMAGE AND SCATTERED INTENSITY FOR PARTICLE MEASURING APPARATUS AND PARTICLE MEASURING METHOD

TECHNICAL FIELD

The present invention relates to a particle measuring apparatus and a particle measuring method. The present invention claims priority of JP2021-114557B filed on Jul. 9, 2021, and for designated countries where incorporation by reference of documents is permitted, the content described in the application is incorporated into this application by reference.

BACKGROUND ART

PTL 1 relates to a technique for measuring the particle size distribution of a sample and discriminating materials, and describes "There is provided a particle swarm measuring apparatus capable of estimating the particle size, average particle size, dispersion of particle size, number of particles, and refractive index of particles to be measured in a non-contact manner and over an extremely short period of time. The particle swarm measuring apparatus creates a scattered light intensity theoretical value table in advance by preliminary calculation processing. Then, a first polarization camera and a second polarization camera are provided at the positions of the scattering angle $\pm\theta$ determined at the time of the preliminary calculation processing. The distance minimum value calculation unit specifies the record of the scattered light intensity theoretical value table that has the highest degree of similarity between the measured first wavelength first scattered light intensity ($I_{1\lambda 1}$) and the measured first wavelength second scattered light intensity ($I_{2\lambda 1}$), which are output from the first polarization camera, and the measured second wavelength first scattered light intensity ($I_{1\lambda 2}$) and the measured second wavelength second scattered light intensity ($I_{2\lambda 2}$), which are output from the second polarization camera, and outputs the refractive index m, the standard deviation $\sigma_g$, the average particle size $D_g$, and the number of particles n".

CITATION LIST

Patent Literature

PTL 1: WO2020/096038A

SUMMARY OF INVENTION

Technical Problem

In the technique of PTL 1, wavelength components corresponding to two light sources are extracted from scattered light scattered by a particle swarm using a color filter, and a vertically polarized component and a horizontally polarized component are extracted using a polarization camera. Further, in the technique of the document, the average particle size, standard deviation, number of particles, and refractive index of the particle swarm are estimated using these four extracted values. However, the technique of this document uses two polarization cameras, which are more expensive than general charge-coupled device (CCD) cameras, and thus has the problem of an increase in cost of the apparatus.

The present invention has been made in view of the above problems, and an object thereof is to simultaneously perform particle size measurement and material discrimination with a less expensive configuration.

Solution to Problem

The present application includes a plurality of means for solving at least some of the above problems, and examples thereof are as follows. According to an aspect of the present invention that solves the above problems, a particle measuring apparatus includes: a first light source and a second light source that irradiate a sample containing particles of a predetermined material with parallel light; an imaging unit that captures a scattered light image of the particles by the parallel light emitted from the first light source, and a shadow image of the particles by the parallel light emitted from the second light source; and an image processing unit that performs material discrimination of the particles based on correspondence between scattered light intensity of the particles specified based on the scattered light image and a shadow size of the particles specified based on the shadow image, and a theoretical correlation curve showing a theoretical value of the correspondence of the particles, and calculates a particle size of the particles.

Advantageous Effects of Invention

According to the present invention, particle size measurement and material discrimination can be performed simultaneously with a less expensive configuration.

BRIEF DESCRIPTION OF DRAWINGS

FIG. 1 is a diagram showing an example of a schematic configuration of a particle measuring apparatus according to a first embodiment.

FIG. 2 is a diagram showing an example of a hardware configuration of a processing device.

FIG. 3 is a diagram showing an example of a cross section of a measuring unit.

FIG. 4 is a diagram showing an example of a cross-sectional configuration of a measuring unit during particle measurement.

FIG. 6 is a diagram showing an example of a shadow image.

FIG. 7 is a flowchart showing an example of particle measuring processing.

FIG. 8 is a flowchart showing an example of captured image analysis processing.

FIGS. 9A through 9D are diagrams showing an example of a theoretical correlation curve.

FIG. 10 is a diagram showing an example of a schematic configuration of a particle measuring apparatus according to a second embodiment.

FIG. 11 is a flowchart showing an example of imaging and captured image analysis processing according to the second embodiment.

FIG. 14 is a diagram showing an example of a schematic configuration of a particle measuring apparatus according to a third embodiment.

FIG. 15 is a flowchart showing an example of imaging and captured image analysis processing according to the third embodiment.

FIG. 16 is a flowchart showing an example of refractive index estimation processing according to a fourth embodiment.

DESCRIPTION OF EMBODIMENTS

Figures 5A, 5B:
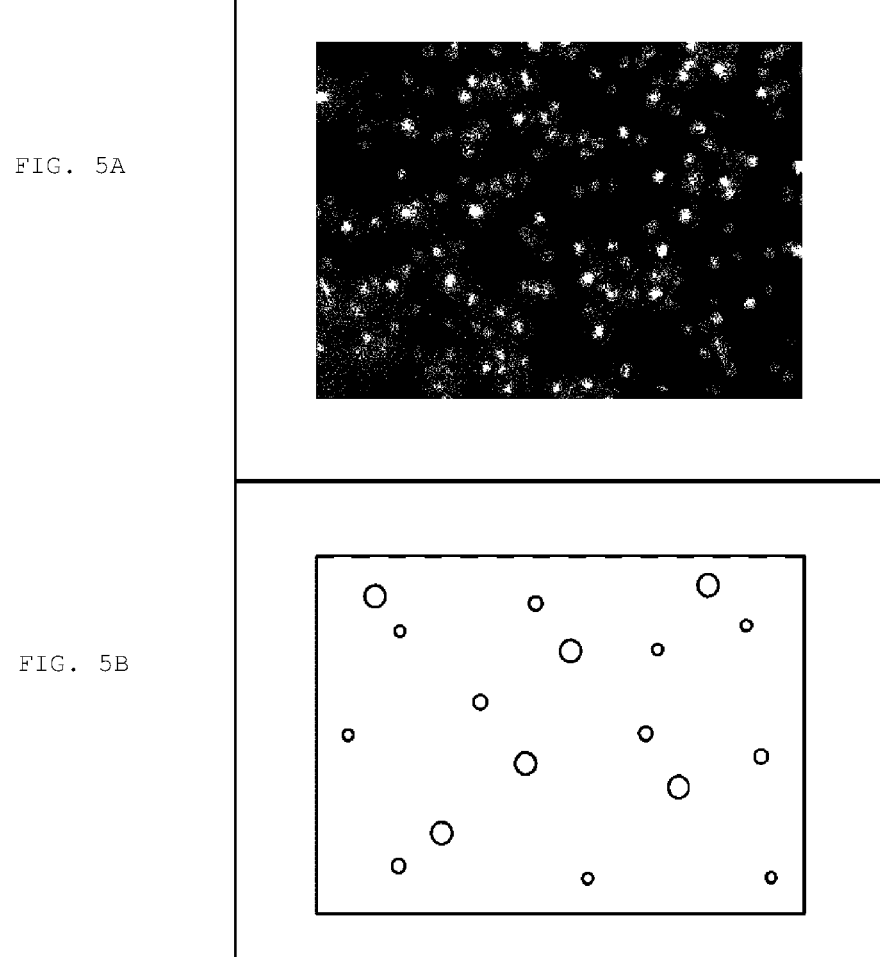
FIGS. 5A and 5B are diagrams relating to an example of a scattered light image.
Figures 12A, 12B, 12C, 12D, 12E, 12F:
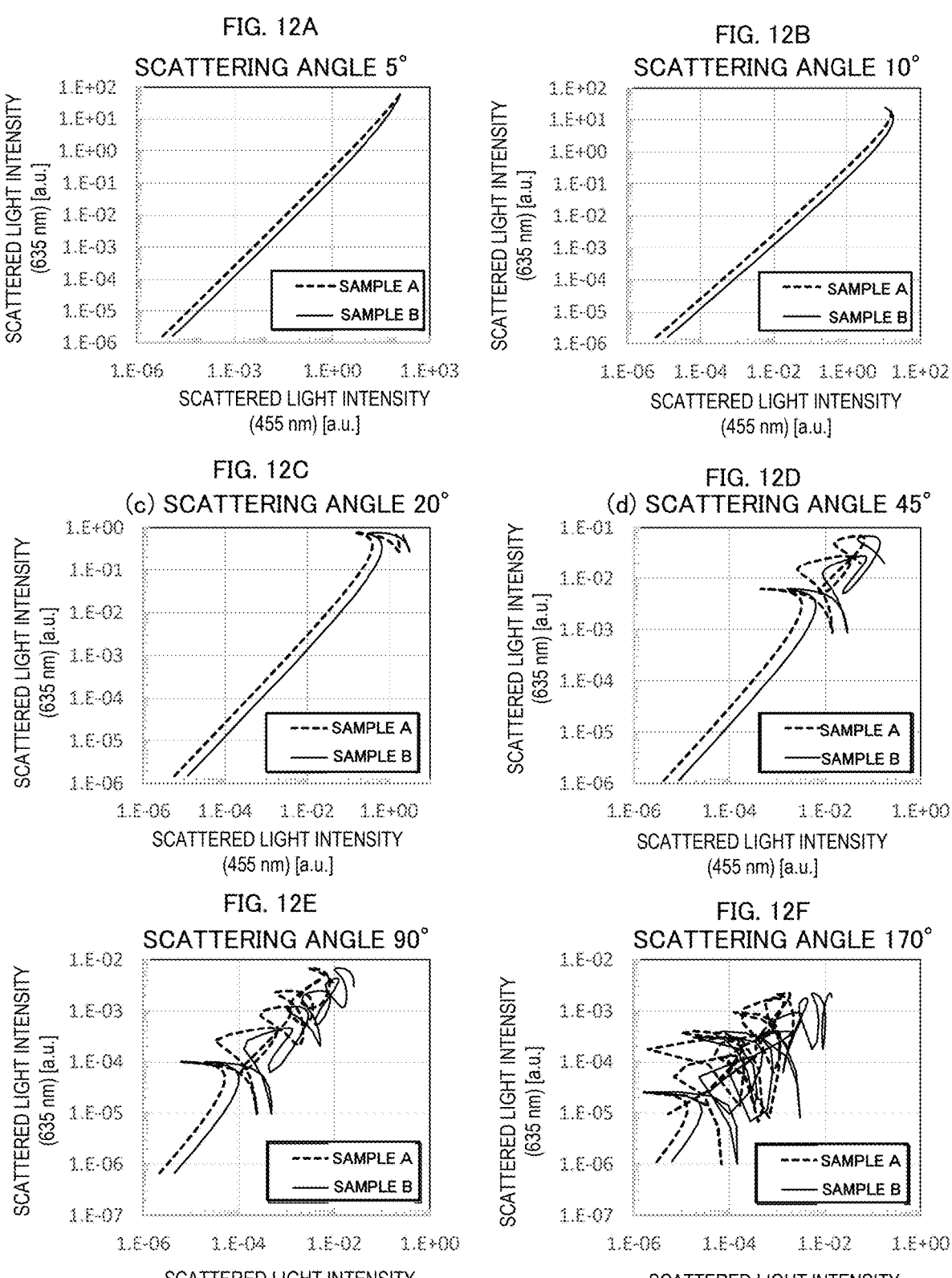
FIGS. 12A through 12F are diagrams showing an example of a graph drawing theoretical correlation curves of samples having different refractive indices.

Hereinafter, each embodiment of the present invention will be described with reference to the drawings.

First Embodiment

FIG. 1 is a diagram showing an example of a schematic configuration of a particle measuring apparatus 100 according to this embodiment. The particle measuring apparatus 100 includes a first light source 1, a second light source 2, a measuring unit 3, a microscope 4, an imaging unit 5, a light shielding plate 6, an image processing unit 7, a control unit 8, a light source switching unit 9, a storage unit 10, and a communication unit 11.

The first light source 1 is a device that irradiates the sample flowing in the sample container of the measuring unit 3 with parallel light A. A light-emitting element such as an LED or a laser is used for the first light source 1, for example. It should be noted that when using a laser, speckles may occur due to optical interference of a particle swarm contained in the sample. In that case, for example, a diffuser or a speckle reducer may be provided to reduce such coherence.

As shown in the drawing, the first light source 1 is located at a position substantially facing the microscope 4 with the measuring unit 3 interposed therebetween. It should be noted that the substantially facing position means that the parallel light A of the first light source 1 and an optical axis X of the microscope 4 do not match, that is, the parallel light A of the first light source 1 and the optical axis X of the microscope 4 are not parallel but intersect each other.

Specifically, the first light source 1 and the microscope 4 are located facing each other such that the parallel light A and the optical axis X intersect each other at a predetermined angle θth of less than 90°. Further, the parallel light A is set such that the parallelism distribution width with respect to the optical axis X is sufficiently smaller than the angle θth. The angle θth is preferably set in a range of 10° to 30°, for example.

The beam size and shape of the parallel light A are designed such that only the light scattered by the particles of the sample in the sample container is imaged by the imaging unit 5 of the microscope 4 (that is, the component that has traveled straight without being scattered is prevented from entering the imaging unit 5), and the entire range of the field of view of the microscope 4 in the fluid flowing in the sample container can be irradiated.

In addition, in order to prevent unnecessary light (for example, light directly incident from the first light source 1) from entering the microscope 4, the incident portion of the microscope 4 can also be provided with the light shielding plate 6 between the sample and the microscope 4. Due to the action of the light shielding plate 6, only the scattered light in a predetermined angle range (scattered light with a predetermined angle θth or less) among the scattered light scattered by the particles of the sample enters the microscope 4.

The second light source 2 is a device that irradiates the sample flowing in the sample container of the measuring unit 3 with parallel light B. Similar to the first light source 1, a light-emitting element such as an LED or a laser is used for the second light source 2.

Further, the second light source 2 is located at a position substantially facing the microscope 4 with the measuring unit 3 interposed therebetween. In addition, the second light source 2 is set such that the optical axis of the parallel light B substantially matches the optical axis X of the microscope 4.

The measuring unit 3 is a device that receives the parallel light A and the parallel light B from the first light source 1 and the second light source 2, respectively, on the sample that fills the sample container held therein. Details of the measuring unit 3 will be described later.

The microscope 4 is a device which is located at a position substantially facing the first light source 1 and the second light source 2 with the measuring unit 3 interposed therebetween, converts the incident light (the parallel light A based on the first light source 1 and the parallel light B based on the second light source 2) into an electric signal by the imaging unit 5, and generate image information. The objective side of the microscope 4 is focused on the sample, and the optical system is designed such that the imaging unit 5 of the microscope 4 can image the scattered light from each particle and the shadow of the particle.

Further, the microscope 4 is preset with a focal length and a lens diameter for preventing the rectilinear component of the parallel light A from entering the imaging unit 5. Specifically, the microscope 4 images the component of the scattered light that is substantially parallel to the optical axis X (the component of which the angle from the optical axis X is a predetermined angle θth or less), and accordingly, the focal length is set as large as possible with respect to the lens diameter.

The imaging unit 5 is an imaging device (imaging element) that receives light incident on the microscope 4 and converts the received light into an electric signal to capture a scattered light image and a shadow image. Specifically, when the parallel light A from the first light source 1 is emitted, the imaging unit 5 receives the scattered light scattered by the particles in the sample container and captures the scattered light image. In addition, when the parallel light B from the second light source 2 is emitted, the imaging unit 5 captures a shadow image showing the shadow of the particles in the sample container. In addition, the imaging unit 5 outputs image information of the captured image to the image processing unit 7.

The image processing unit 7, the control unit 8, the light source switching unit 9, the storage unit 10, and the communication unit 11 are functional units realized by a processing device provided in the particle measuring apparatus 100 to execute various processing such as image processing, light source control and switching, predetermined information storing, and communication with external apparatuses. Therefore, the image processing unit 7, the control unit 8, the light source switching unit 9, the storage unit 10, and the communication unit 11.

Specifically, the image processing unit 7 is a functional unit that analyzes image information acquired from the imaging unit 5. More specifically, the image processing unit 7 calculates the particle size distribution of the particles contained in the sample and discriminates the material based on the scattered light intensity and shadow size of the particles. It should be noted that the image processing unit 7 has a scattered light intensity processing unit 71 and a shadow size measuring processing unit 72.

The scattered light intensity processing unit 71 is a functional unit that uses the scattered light image acquired from the imaging unit 5 to calculate the scattered light intensity of each particle provided in the scattered light image. Specifically, the scattered light intensity processing unit 71 acquires the scattered light image obtained by capturing the scattered light obtained by scattering the parallel light A, which is emitted to the sample from the first light source 1 at a predetermined angle θth or less, from the imaging unit 5, and calculates the scattered light intensity for each particle using the acquired scattered light image.

The shadow size measuring processing unit 72 is a functional unit that uses the shadow image acquired from the imaging unit 5 to calculate the size of each particle provided in the shadow image. Specifically, the shadow size measuring processing unit 72 acquires a shadow image obtained by capturing the shadow of each particle caused by the parallel light B emitted to the sample from the second light source 2, from the imaging unit 5 and using the acquired shadow image, the shadow size measuring processing unit 72 calculates the size of each particle.

It should be noted that the image processing unit 7 acquires the calculation results calculated by the scattered light intensity processing unit 71 and the shadow size measuring processing unit 72, and outputs instructions regarding control to the control unit 8 according to the analysis results of the captured image based on the calculation results. It should be noted that the image processing unit 7 may output information for monitoring the measurement status or the like to an external display or the like.

The control unit 8 is a functional unit that controls operations of the particle measuring apparatus 100. Specifically, the control unit 8 outputs an instruction for controlling the first light source 1 and the second light source 2 to the light source switching unit 9. In addition, the control unit 8 controls the operation of the measuring unit 3.

Further, the control unit 8 may output an alarm signal based on the analysis processing result of the image information by the image processing unit 7. In addition, the control unit 8 may perform information communication with an external apparatus via the communication unit 11. In this case, the control unit 8 transmits, for example, analysis results of image information acquired from the image processing unit 7 (for example, particle size distribution status, and material discrimination results) via the communication unit 11 to an external apparatus connected via a network such as a local region network (LAN) or a public network.

The light source switching unit 9 is a functional unit that switches lighting of the first light source 1 and the second light source 2 based on the control instruction acquired from the control unit 8.

The storage unit 10 is a functional unit that stores predetermined information. Specifically, the storage unit 10 stores theoretical correlation curves corresponding to material types of particles contained in the sample. Details of the theoretical correlation curve will be described later.

The communication unit 11 is a functional unit that performs information communication with an external apparatus. For example, the communication unit 11 transmits information indicating analysis results of image information to the external apparatus. In addition, the communication unit 11 acquires predetermined information (for example, an analysis result acquisition request) from an external apparatus.

FIG. 2 is a diagram showing an example of a hardware configuration of a processing device that realizes the image processing unit 7, the control unit 8, the light source switching unit 9, the storage unit 10, and the communication unit 11. As shown, the processing device has an arithmetic device 110, a main storage device 120, an auxiliary storage device 130, a communication device 140, and a bus 150 electrically interconnecting them.

The arithmetic device 110 may be a processor such as a central processing unit (CPU) or a graphics processing unit (GPU), or other semiconductor devices as long as the semiconductor devices are subjects that executes predetermined processing. The main storage device 120 is a memory device such as a random access memory (RAM) and a read only memory (ROM).

The auxiliary storage device 130 is a non-volatile storage device such as a so-called hard disk drive, solid state drive (SSD), or flash memory that can store digital information.

The communication device 140 is a device that performs wired communication via a network cable or a device that performs wireless communication via an antenna. The communication device 140 performs information communication with other devices connected to a network N.

An example of the hardware configuration of the processing device provided in the particle measuring apparatus 100 has been described above.

It should be noted that the image processing unit 7, the control unit 8, and the light source switching unit 9 are realized by a program that causes the arithmetic device 110 to perform processing. This program is stored in the main storage device 120 or the auxiliary storage device 130, loaded onto the main storage device 120 upon execution of the program, and executed by the arithmetic device 110. In addition, the storage unit 10 is realized by the main storage device 120, the auxiliary storage device 130, or a combination thereof. Further, the communication unit 11 is realized by the communication device 140.

It should be noted that each configuration, function, processing unit, processing means, and the like of the processing device may be realized by hardware, for example, by designing an integrated circuit at part or in whole. Moreover, the above configurations and functions may be realized by software by a processor interpreting and executing a program for realizing each function. Information such as programs, tables, and files that realize each function can be stored in storage devices such as memories, hard disks, and SSDs, or recording media such as IC cards, SD cards, and DVDs.

Next, a detailed configuration of the measuring unit 3 will be described.

FIG. 3 is a diagram showing an example of a cross section of the measuring unit 3. As shown in the drawing, the measuring unit 3 includes a sample container 31 having openings at the upper and lower ends, a pipe 32 connected to the opening of the sample container 31, a first valve 33 (refer to FIG. 1) that controls injection (inflow) of the sample into the sample container 31 through the pipe 32, an irradiation window driving unit 34 provided on the wall surface of the sample container 31, an irradiation window 35 provided at one end of the irradiation window driving unit 34, an observation window 36 provided on the wall surface of the sample container 31 facing the window 35, a nozzle 37 having a discharge port located in the sample container 31, a tube 38 connected to the nozzle 37, and a second valve 39 connected to the tube 38.

The first valve 33 has an upstream valve and a downstream valve, and the sample is injected into the sample container 31 when the upstream valve is opened. Further, when the downstream valve is opened, the sample in the sample container 31 is ejected to the outside of the measuring unit 3. In addition, by controlling the opening and closing of the upstream valve and the downstream valve, the flow of the sample in the sample container 31 can be controlled, and the movement of the particles can be prevented during imaging by the imaging unit 5.

Further, the tube 38 is connected to a cleaning liquid storage container, and a cleaning liquid 41 (refer to FIG. 1) in the cleaning liquid storage container is discharged into the sample container 31 by a pump 40 (refer to FIG. 1).

In addition, the second valve 39 has an irradiation window side cleaning valve and an observation window side cleaning valve. When the irradiation window side cleaning valve is opened, the cleaning liquid 41 is discharged onto the irradiation window 35, and when the observation window side cleaning valve is opened, the cleaning liquid 41 is discharged onto the observation window 36.

The sample container 31 is sealed to prevent outside air from entering from the outside, and functions as a sample holding region capable of holding a sample or the cleaning liquid 41 therein.

The sample container 31 is connected to, for example, a manufacturing line (not shown) via the pipe 32, and a sample extracted from the manufacturing line is directly injected. It should be noted that the sample container 31 may be provided at a remote location without being directly connected to the manufacturing line.

Unlike the sample, the cleaning liquid 41 is a liquid that does not scratch the window, such as water or a sample from which solid components have been removed. Also, a liquid having a cleaning effect, such as water to which a dispersant or a surfactant is added, may be used. As a result, the wettability of the window is improved, and adhesion of samples and air bubbles to the window can be prevented. In addition, the cleaning liquid 41 may be slurry containing low-hardness particles such as resinous particles that do not scratch the window. Such particles can be removed by impacting the low-hardness particles with particles strongly adhering to the window.

The observation window 36 is a window for observing the sample in the sample container 31 with the microscope 4. The observation window 36 is transparent to at least the wavelengths of the parallel light A and the parallel light B. The optical system is set such that the focus of the microscope 4 is positioned near the surface of the observation window 36 on the sample side.

The irradiation window 35 is a window for irradiating the inside of the sample container 31 with the parallel light A and the parallel light B. The irradiation window 35 is provided in the sample container 31 to face the observation window 36. The irradiation window 35 is transparent to at least the wavelengths of the parallel light A and the parallel light B.

The irradiation window driving unit 34 is a drive mechanism that drives the irradiation window 35 in the direction of the optical axis X of the microscope 4. Specifically, the irradiation window driving unit 34 adjusts the distance between the irradiation window 35 and the observation window 36 by driving the irradiation window 35 closer to the observation window 36 or away from the observation window 36. It should be noted that the irradiation window driving unit 34 may be manually moved by the user.

The position of the irradiation window driving unit 34 shown in FIG. 3 indicates the position during cleaning. At this time, the discharge ports of the nozzles 37 are directed toward the irradiation window 35 and the observation window 36 respectively, and the cleaning liquid 41 is discharged toward the irradiation window 35 and the observation window 36.

A seal mechanism is provided between the irradiation window driving unit 34 and the sample container 31 to prevent outside air from entering the sample container 31 and to make the movement of irradiation window driving unit 34 possible. Sealing mechanisms include O-rings, diaphragms, and the like.

Each discharge port of the nozzles 37 is located upstream of the irradiation window 35 and the observation window 36 with respect to the sample flowing direction. As a result, the cleaning liquid 41 discharged from the nozzle 37 is ejected from the sample container 31 together with the sample.

In addition, the sample is subjected to dilution and dispersion processing as necessary such that the particles do not overlap each other when the sample in the sample container 31 is imaged by the microscope 4.

Also, the parallel light A and the parallel light B enter from the irradiation window 35 and are emitted to the sample. A component of the parallel light A that has traveled straight without being scattered by particles in the sample passes through the observation window 36 and exits the measuring unit 3. The imaging unit 5 of the microscope 4 images the component of the parallel light A scattered by the particles of the sample in the direction of the optical axis X of the microscope 4 (scattered light scattered at a scattering angle θth or less) through the observation window 36. Further, the imaging unit 5 of the microscope 4 images, through the observation window 36, the component of the parallel light B that has traveled straight without being scattered by the particles in the sample.

It should be noted that the observation window 36 is desirably set to have a sufficient size such that all the rectilinear components of the parallel light A can pass through. This is to prevent the light reflected and scattered in the sample container 31 from entering the microscope 4 and deteriorating the signal-to-noise ratio (S/N) ratio of captured image information.

In order to prevent diffuse reflection of light inside the sample container 31, the inner wall of the sample container 31 may be coated with a light absorbing agent, or a light absorbing member may be provided in the sample container 31.

FIG. 4 is a diagram showing an example of a cross-sectional configuration of the measuring unit 3 during particle measurement. As shown in the drawing, the irradiation window 35 moves closer to the observation window 36 from the cleaning position in accordance with the movement of the irradiation window driving unit 34. Therefore, the distance between the irradiation window 35 and the observation window 36 is narrowed, the thickness of the microscope 4 in the optical axis X direction is reduced, and the region (volume) of the sample irradiated with the parallel light A and the parallel light B is reduced.

Accordingly, overlapping of particles when the sample is imaged can be prevented, and the influence of scattered light due to particles outside the focal range of the microscope 4 can be prevented. In addition, by bringing the irradiation window 35 and the observation window 36 as close as possible, the movement of the particles is prevented, and the blurring during imaging and the positional deviation caused by the movement of the particles while switching the light source can be prevented.

After the end of imaging by the microscope 4, the irradiation window 35 is moved away from the observation window 36 by the action of the irradiation window driving unit 34. After the irradiation window 35 and the observation window 36 are separated from each other, the sample in the sample container 31 is replaced.

It should be noted that the measuring unit 3 is provided with an operation control mechanism (not shown) that operates each of the first valve 33, the irradiation window driving unit 34, the second valve 39, and the pump 40. The operation control mechanism is, for example, a drive motor that opens and closes the first valve 33 and the second valve 39 and moves the irradiation window driving unit 34 (movement in the optical axis X direction), and is a switch for switching ON and OFF of the pump 40. These operation control mechanisms performs opening and closing of the first valve 33 and the second valve 39, the movement of the irradiation window driving unit 34, and a predetermined operation such as ON and OFF of the pump 40, based on control by the control unit 8 (for example, control by changing the applied voltage to the operation control mechanism).

FIGS. 5A and 5B are a diagram relating to an example of the scattered light image captured by the imaging unit 5. Specifically, FIG. 5A is a diagram showing an example of the scattered light image of alumina particles. FIG. 5B is a diagram schematically showing the scattered light image. It should be noted that the schematic diagram of FIG. 5B is a diagram for illustrating the scattered light image, and does not correspond to the scattered light image of FIG. 5A.

As shown in FIGS. 5A and 5B, each point in the scattered light image indicates scattered light from each individual particle. The scattered light intensity processing unit 71 identifies each particle to be measured using such a scattered light image, and acquires the scattered light intensity of each particle.

Specifically, the scattered light intensity processing unit 71 specifies a pixel group (pixel group) corresponding to each particle provided in the scattered light image, and acquires the value of the pixel with the highest luminance value in the pixel group as the scattered light intensity of the particle. Further, the scattered light intensity processing unit 71 may use the peak intensity of the curve obtained by fitting with a Gaussian distribution or the like as the scattered light intensity.

When the scattered light intensity is out of the luminance range of the captured image, the output of the first light source 1, the exposure time of the imaging unit 5, or the gain of the imaging unit 5 may be adjusted.

In addition, when the scattered light intensity of each particle differs greatly and the scattered light intensity of all the particles does not fall within the luminance range of the scattered light image, for example, the output of the first light source 1, the exposure time of the imaging unit 5, or the gain of the imaging unit 5 may be changed, and imaging may be performed a plurality of times. It should be noted that such various adjustments may be executed by the image processing unit 7 analyzing the captured image and outputting instructions to the control unit 8 according to the analysis results.

FIG. 6 is a diagram showing an example of the shadow image. Each dot in the drawing indicates the shadow of each particle. The shadow size measuring processing unit 72 uses the shadow image captured by the imaging unit 5 to identify each particle and acquires the shadow size of each particle.

Specifically, the shadow size measuring processing unit 72 acquires the area of the pixel group corresponding to each particle provided in the shadow image as the shadow area of the particle. Further, when the particle shape is assumed to be circular, for example, the shadow area may be obtained by converting the area into an equivalent circle diameter.

It should be noted that the shadow size of the particles obtained in the shadow image is larger than the actual particle shape due to the diffraction of light by the lens. The effect of diffraction is inversely proportional to the numerical aperture of the lens, and correction is required when a lens with an insufficiently large numerical aperture is used. In that case, since the diffraction profile is given by Equation (1), the true shape of the shadow can be estimated by performing fitting using Equation (1).

[Math. 1]

$$y = \left( \frac{2J_1(x)}{x} \right)^2 \tag{1}$$

It should be noted that y in Equation (1) indicates the intensity of the diffracted light. In addition, x indicates the diffraction radius. Also, $j_i$ indicates the Bessel function.

Explanation of Operation

Next, particle measuring processing will be described.

FIG. 7 is a flowchart showing an example of particle measuring processing. First, an operation control mechanism (not shown) provided in the measuring unit 3 performs the following operations based on the control of the control unit 8. Specifically, the operation control mechanism opens the first valve 33 (upstream valve and downstream valve) to introduce (inject) the sample into the sample container 31 (step S10). Further, when the inside of the sample container 31 is replaced with the sample after a predetermined time has passed, the operation control mechanism closes the first valve 33 (the upstream valve and the downstream valve) to stop introducing the sample (step S20).

Further, the operation control mechanism moves the irradiation window driving unit 34 such that the irradiation window 35 is at the measurement position shown in FIG. 4 (step S30).

Further, the particle measuring apparatus 100 irradiates the sample with the parallel light A from the first light source 1 (step S40). Specifically, the light source switching unit 9 causes the first light source 1 to emit the parallel light A based on the instruction from the control unit 8.

The imaging unit 5 also captures a scattered light image (step S50). Specifically, the imaging unit 5 captures a scattered light image by receiving scattered light obtained by scattering the parallel light A emitted to the sample at the predetermined angle θth or less on the particles. The imaging unit 5 outputs image information of the captured scattered light image to the image processing unit 7.

Further, the particle measuring apparatus 100 irradiates the sample with the parallel light B from the second light source 2 (step S60). Specifically, the light source switching unit 9 causes the second light source 2 to emit the parallel light B based on the instruction from the control unit 8.

In addition, the imaging unit 5 captures the shadow image (step S70). Specifically, the imaging unit 5 images the shadow of each particle caused by the parallel light B with which the sample is irradiated. The imaging unit 5 outputs image information of the captured shadow image to the image processing unit 7.

The imaging unit 5 also uses the scattered light image and the shadow image acquired from the imaging unit 5 to perform the captured image analysis processing (step S80). Details of the captured image analysis processing by the image processing unit 7 will be described later.

Next, the operation control mechanism opens the downstream valve of the first valve 33 (step S90), turns on the pump 40, and opens the second valve 39 (in this case, both the irradiation window side cleaning valve and the observation window side cleaning valve), and starts discharging the cleaning liquid into the sample container 31 (step S100).

Further, the operation control mechanism moves the irradiation window driving unit 34 such that the irradiation window is at the cleaning position shown in FIG. 3 (step S110).

After the irradiation window 35 is moved to the cleaning position, the operation control mechanism closes the observation window side cleaning valve, and discharges the cleaning liquid to the irradiation window 35 for a predetermined time to remove the adhered particles (step S120).

Next, the operation control mechanism opens the observation window side cleaning valve, closes the irradiation window side cleaning valve, and discharges the cleaning liquid to the observation window 36 for a predetermined time to remove the adhered particles (step S130). After that, the operation control mechanism turns off the pump 40, closes the observation window side cleaning valve to stop discharging the cleaning liquid (step S140), closes the downstream valve (step S150), and fills the inside of the sample container 31 with the cleaning liquid. When continuous measurement is to be continued (Yes in step S160), the particle measuring apparatus 100 waits until the next measurement timing (S170), and starts the processing from step S10 at the next measurement. On the other hand, when the continuous measurement is not to be continued (No in step S160), the particle measuring apparatus 100 ends the particle measuring processing.

The particle measuring processing has been described above.

Next, the captured image analysis processing executed by the particle measuring apparatus 100 will be described.

FIG. 8 is a flowchart showing an example of the captured image analysis processing. Such processing corresponds to the processing of step S80 in FIG. 7.

When the processing is started, the scattered light intensity processing unit 71 calculates the scattered light intensity of each particle using the scattered light image acquired from the imaging unit 5 (step S200). Specifically, the scattered light intensity processing unit 71 identifies each particle provided in the scattered light image. The scattered light intensity processing unit 71 also calculates the position $(x1i, y1i)$ in the scattered light image and the scattered light intensity $I1i$ based on the luminance value for each identified particle i.

Next, the shadow size measuring processing unit 72 calculates the shadow size of each particle using the shadow image acquired from the imaging unit 5 (step S210). Specifically, the shadow size measuring processing unit 72 identifies each particle provided in the shadow image. The shadow size measuring processing unit 72 also calculates the position $(x2j, y2j)$ in the shadow image and the shadow size (shadow size) $D2j$ for each identified particle j.

Next, the image processing unit 7 specifies matching particles in the scattered light image and the shadow image (step S220). Specifically, the image processing unit 7 compares the positional relationship between each particle i obtained from the scattered light image and the particle j obtained from the shadow image, and determines whether the particles are the same in both image information.

More specifically, when the distance between the specified particle i and particle j is equal to or less than a predetermined threshold value, the image processing unit 7 determines that both particles are the same particle. Accordingly, particles that match each other in the scattered light image and the shadow image are specified.

It should be noted that the reason why the distance between the particle i and the particle j is set to be equal to or less than a predetermined threshold value as the determination condition is to consider the occurrence of a positional deviation between the position of the particle i in the scattered light image and the corresponding particle j in the shadow image due to the time difference in switching the light source.

Next, the image processing unit 7 generates a graph showing the correspondence between the scattered light intensity and the shadow size (corresponding to the particle size, which will be described later) for each particle determined to be the same particle (step S230). Specifically, the image processing unit 7 assigns the corresponding scattered light intensity $I1i$ and the shadow size $D2j$ to each particle determined to be the same. Based on the assigned scattered light intensity and shadow size, the image processing unit 7 plots the measurement points of each particle on a graph in which the vertical axis indicates the scattered light intensity and the horizontal axis indicates the shadow size.

At this time, the image processing unit 7 acquires a predetermined number (for example, two) of theoretical correlation curves corresponding to the expected predetermined sample and scattering angle (θth) from the storage unit 10, and draws the acquired theoretical correlation curves superimposed on the graph.

A theoretical correlation curve corresponding to each sample of particles can be calculated based on the Mie scattering theory. The scattered light intensity of each sample depends on the particle size, refractive index and scattering angle of particles. That is, samples having different refractive indices have different correlations between particle size and scattered light intensity. Therefore, the theoretical correlation curves of samples having different refractive indices can be expressed as curves having different shapes. Therefore, based on the Mie scattering theory, the scattered light intensity for each particle size can be obtained by using the refractive index corresponding to each sample as an input parameter. In this manner, a theoretical correlation curve can be generated as a theoretical value indicating the correspondence between scattered light intensity and particle size (corresponding to shadow size) for each material type of each sample.

FIGS. 9A through 9D are a diagram showing an example of a theoretical correlation curve corresponding to a predetermined scattering angle (θth) for predetermined materials (alumina particles and silica particles in this example). Specifically, FIG. 9A is a diagram showing theoretical correlation curves of alumina particles and silica particles when the scattering angle is 10°. In addition, FIG. 9B is a diagram showing theoretical correlation curves of alumina particles and silica particles when the scattering angle is 45°. Further, FIG. 9C is a diagram showing theoretical correlation curves of alumina particles and silica particles when the scattering angle is 90°. FIG. 9D is a diagram showing theoretical correlation curves of alumina particles and silica particles when the scattering angle is 170°. In these graphs, the vertical axis indicates the scattered light intensity, and the horizontal axis indicates the particle size corresponding to the shadow size.

As shown in FIGS. 9A to 9D, it can be seen that the theoretical correlation curves of materials having different refractive indices are expressed as curves having mutually different shapes. It can also be seen that even for the same sample, when the scattering angle is different, the shape of the theoretical correlation curve will be different.

When the measurement points of each particle are plotted on a graph drawing the theoretical correlation curve of the expected material type, the measurement points are plotted on or in the vicinity of the corresponding theoretical correlation curve. Therefore, when it is possible to predict the material type contained in the sample and the refractive index thereof, it is possible to discriminate which material the particle at each measurement point is by drawing theoretical correlation curves corresponding to those materials on a graph. Specific processing of material discrimination will be described later.

In this embodiment, theoretical correlation curves corresponding to various materials and scattering angles are stored in advance in the storage unit 10, but such theoretical correlation curves may be generated at the processing timing of step S230.

Next, the image processing unit 7 performs particle size distribution calculation and material discrimination based on the comparison between the theoretical correlation curve drawn on the graph and the measurement points (step S240). Specifically, the image processing unit 7 calculates the shortest distance between each measurement point plotted on the graph and the theoretical correlation curve corresponding to the predetermined material type and scattering angle (θth) drawn on the graph.

More specifically, when the two types of theoretical correlation curves shown in FIG. 9A are drawn on the graph, the image processing unit 7 calculates the shortest distance from each of the plotted drawn measurement point to each theoretical correlation curve.

Further, the image processing unit 7 specifies the theoretical correlation curve corresponding to the minimum shortest distance among the calculated shortest distances. Then, the image processing unit 7 specifies the sample corresponding to the specified theoretical correlation curve as the sample of the particles to be measured. In this manner, the image processing unit 7 discriminates the material of the particles (samples) to be measured.

It should be noted that the material discrimination method is not limited to this. For example, the image processing unit 7 may obtain the average value of the shortest distances from each measurement point to each theoretical correlation curve, and specify the material corresponding to the theoretical correlation curve with the smaller average value as the material of the particles to be measured.

The image processing unit 7 also specifies the shadow size corresponding to the point on the theoretical correlation curve closest to each measurement point (in this case, the theoretical correlation curve corresponding to the sample of the particles to be measured) from the graph. Further, the image processing unit 7 specifies the particle size corresponding to the specified shadow size as the particle size of the particles to be measured at each measurement point.

Then, the image processing unit 7 calculates the particle size distribution of the specified sample particles based on the number of measurement points and the specified particle size.

Further, when the image processing unit 7 calculates the material discrimination and the particle size distribution, the image processing unit 7 ends the processing of this flow.

The captured image analysis processing has been described above.

According to the particle measuring apparatus, particle size measurement and material discrimination can be performed simultaneously with a less expensive configuration. In particular, according to the particle measuring apparatus, it is possible to discriminate which material each measurement point corresponds to by using the theoretical correlation curve corresponding to each material. In addition to material discrimination, the particle measuring apparatus can also calculate the particle size distribution of particles corresponding to each sample.

Since the scattered light intensity increases as the scattering angle decreases, it is desirable to increase the measurement sensitivity by reducing the scattering angle θth as much as possible.

Further, as shown in FIGS. 9A, 9C, and 9D, the theoretical correlation curve of silica particles and the theoretical correlation curve of alumina have several intersection points depending on the scattering angle, it is difficult to perform material discrimination in the vicinity of these points. In that case, as shown in FIG. 9B, material discrimination can be performed by setting the scattering angle to 45° and using a theoretical correlation curve having no intersection points.

Also, the optimum scattering angle differs depending on the material type and expected particle size range. Therefore, a mechanism may be provided for adjusting the irradiation angle of the parallel light A in the first light source 1 such that the scattering angle can be changed as appropriate.

In addition, the theoretical correlation curve shown in FIGS. 9A to 9D is for the case where the particle shape is spherical. When the particles are non-spherical or have unevenness on the surface of the particles, the scattered light intensity will be measured with variations around the theoretical correlation curve. Therefore, by obtaining the dispersion and standard deviation of the shortest distance between the theoretical correlation curve and the measurement points, the particle shape and the degree of unevenness of the particle surface can be evaluated.

In addition, the particle measuring apparatus 100 can easily remove particles that have adhered or remained on the irradiation window 35 or the observation window 36 by a cleaning mechanism using the nozzle 37.

In addition, in the present embodiment, an example of an optical system has been described in which the rectilinear component of the parallel light A does not enter the imaging unit 5. However, instead of this, a polarized light source may be used as the first light source 1 by installing a polarizing filter between the sample and the imaging unit 5. The polarized light source includes, for example, a laser light source with polarized light, a combination of a polarizing filter and the first light source 1, or the like. Such a polarized light source can also prevent the rectilinear component of the parallel light A from entering the imaging unit 5.

In this embodiment, an example has been described in which each of the nozzles 37 is located at the positions shown in FIG. 3 and the cleaning liquid 41 is alternately discharged. However, each nozzle 37 may be located at a position where the discharged cleaning liquid 41 does not collide, and the cleaning liquid 41 may be discharged from each nozzle 37 at the same time.

Further, in the present embodiment, an example has been described in which the cleaning liquid 41 is stored in the cleaning liquid storage container in the measuring unit 3 and supplied, but the cleaning liquid 41 may be supplied from a supply utility outside the measuring unit 3.

In this embodiment, an example has been described in which the flow of the sample during imaging based on the movement of the irradiation window driving unit 34 is temporarily prevented, but the light source may be switched with respect to the movement speed of the particles, or the imaging time may be sufficiently shortened to allow imaging while the sample is flowing.

Second Embodiment

FIG. 10 is a diagram showing an example of a schematic configuration of the particle measuring apparatus 100 according to a second embodiment. As shown in the drawing, the particle measuring apparatus 100 according to this embodiment is different in that a third light source 12, a mirror 13, and a wavelength selection mirror 14 are provided instead of the second light source 2 of the first embodiment. It should be noted that the same components as those of the first embodiment will be given the same reference numerals, and the repeating description thereof will be omitted.

The third light source 12 has an output wavelength different from that of the first light source 1, and irradiates the sample held by the measuring apparatus with parallel light C through the mirror 13 and the wavelength selection mirror 14. The optical axis of the parallel light C is set to substantially match the optical axis of the parallel light A from the first light source 1. A light-emitting element such as an LED or a laser is used for the third light source 12, for example.

The wavelength selection mirror 14 has characteristics of transmitting light from the first light source 1 and reflecting light from the third light source 12.

The imaging unit 5 splits the incident light into a plurality of wavelength ranges to capture an image, and captures an image corresponding to each wavelength range. For the imaging unit 5, for example, a color CCD that splits the light into RGB is used.

In addition, the wavelength of the first light source 1 and the wavelength of the third light source 12 are each made to correspond to each spectral wavelength range of the imaging unit 5, and the imaging unit 5 captures a scattered light image in which the parallel light from each light source is scattered by the particles of the sample. Specifically, when the imaging unit 5 is a color CCD that splits the light into RGB, the imaging unit 5 sets the output wavelength of the first light source 1 to red, and captures the scattered light of this red light with R pixels. Further, the imaging unit 5 sets the output wavelength of the third light source 12 to blue, and captures the scattered light of this blue light with B pixels.

FIG. 11 is a flowchart showing an example of imaging and captured image analysis processing according to this embodiment. It should be noted that the particle measuring processing is basically the same as that of the first embodiment, and thus the description thereof will be omitted.

When the processing is started, the particle measuring apparatus 100 irradiates the sample with the parallel light A from the first light source 1, and accordingly, the imaging unit 5 captures a scattered light image scattered at a predetermined scattering angle θth or less (S300).

Next, the scattered light intensity processing unit 71 calculates the scattered light intensity of each particle based on the parallel light A (step S310). Specifically, similarly to step S200, the scattered light intensity processing unit 71 identifies each particle from the scattered light image, and for each identified particle i, the position (x1$i$, y1$i$) in the scattered light image and the scattered light intensity I1$i$ based on the luminance value are calculated.

Next, the particle measuring apparatus 100 switches the light source via the control unit 8 and the light source switching unit 9, and irradiates the sample with the parallel light C from the third light source 12, and accordingly, the imaging unit 5 captures a scattered light image scattered at a predetermined scattering angle θth or less (S320).

Next, the scattered light intensity processing unit 71 calculates the scattered light intensity of each particle based on the parallel light C (step S330). Specifically, similarly to step S200, the scattered light intensity processing unit 71 identifies each particle from the scattered light image, and for each identified particle j, the position (x2$j$, y2$j$) in the scattered light image and the scattered light intensity I2$j$ based on the luminance value are calculated.

Next, the image processing unit 7 specifies matching particles in both captured scattered light images (step S340). Specifically, the image processing unit 7 compares the positional relationship between each particles i and j obtained from both scattered light images, determines whether the particles are the same in both image information, and determines particles matching each other.

Next, the image processing unit 7 generates a graph showing the correspondence between the scattered light intensity I1$i$ and the scattered light intensity I2$j$ in both scattered light images for each particle determined to be the same particle (step S350). Specifically, the image processing unit 7 assigns the corresponding scattered light intensity I1$i$ and the scattered light intensity I2$j$ to each particle determined to be the same. Based on the assigned scattered light intensity, the image processing unit 7 plots the measurement points of each particle on a graph in which the vertical axis indicates the scattered light intensity I1$i$ and the horizontal axis indicates the scattered light intensity I2$j$.

At this time, the image processing unit 7 acquires a predetermined number (for example, two) of theoretical correlation curves corresponding to the expected predetermined sample and scattering angle (θth) from the storage unit 10, and draws the acquired theoretical correlation curves superimposed on the graph.

FIGS. 12A through 12F are diagrams showing an example of a graph drawing theoretical correlation curves of two types of sample A and sample B having different: refractive indices. Specifically, FIGS. 12A to 12F are diagrams in which the theoretical correlation curves of sample A and sample B for scattering angles of 5°, 10°, 20°, 45°, 90°, and 170°, respectively, are drawn. In these graphs, the vertical axis indicates scattered light intensity when light with a wavelength of 635 nm is emitted, and the horizontal axis indicates scattered light intensity when light with a wavelength of 455 nm is emitted. The refractive index of sample A is 1.45 regardless of the wavelength, and the refractive index of sample B is 1.5 at a wavelength of 455 nm and 1.45 at a wavelength of 635 nm. Also, each drawing shows the results for particle sizes from 0.1 μm to 2 μm.

As described above, since the scattered light intensity depends on the refractive index of the particles, based on the Mie scattering theory, sample A and sample B can be expressed as theoretical correlation curves having different shapes. In addition, as shown in FIGS. 12A to 12F, it can be seen that even for the same sample, when the scattering angle is different, the shape of the theoretical correlation curve is different.

When the measurement points of each particle are plotted on a graph drawing the theoretical correlation curve of the expected sample, the measurement points are plotted on or in the vicinity of the corresponding theoretical correlation curve. Therefore, when it is possible to expect the material type contained in the sample and the refractive index thereof, it is possible to discriminate which material the particle at each measurement point is by drawing theoretical correlation curves corresponding to those materials on a graph.

In calculating the theoretical correlation curve used in this embodiment, it is important to consider the wavelength dependence of the refractive index of particles. The wavelength dependence of the refractive index will be described below.

Figure 13:
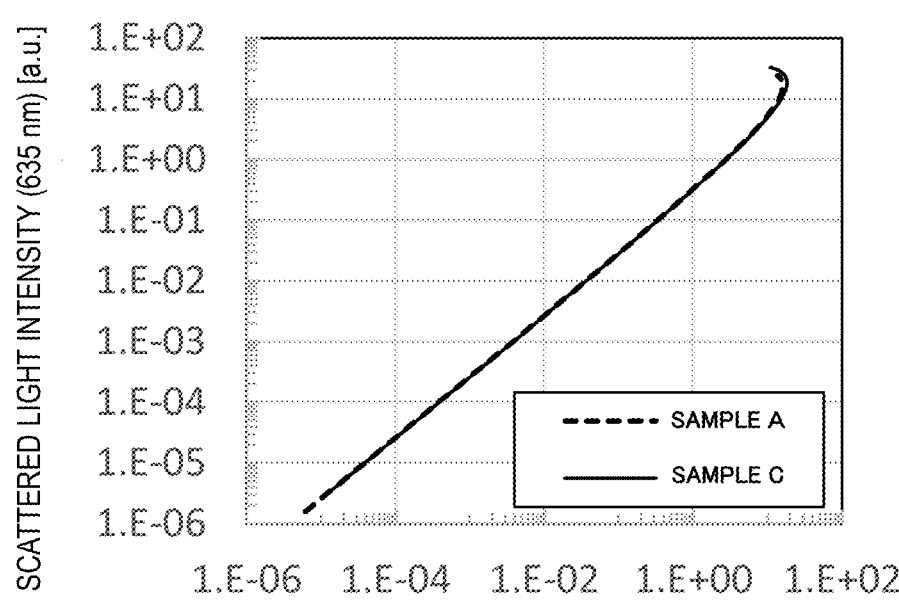
FIG. 13 is a diagram showing an example of a graph of scattered light intensity in two types of samples having no wavelength dependence in refractive index.

FIG. 13 is a diagram showing an example of a graph of scattered light intensity in two types of samples (sample A and sample C) having no wavelength dependence in refractive index. In addition, the vertical axis indicates scattered light intensity when light with a wavelength of 635 nm is emitted, and the horizontal axis indicates scattered light intensity when light with a wavelength of 455 nm is emitted. Moreover, the refractive index of the sample A is 1.45 regardless of the wavelength, and the refractive index of the sample C is 1.5 regardless of the wavelength. Also, the scattering angle is 10° and the particle size is from 0.1 μm to 2 μm. As shown in the drawing, there is a slight difference between the curve of sample A and the curve of sample C, but the difference is clearly smaller than the difference between the curves shown in FIG. 12. This suggests that the wavelength dependence of the refractive index of particles has a large contribution to material discrimination. Since many materials have more or less wavelength dependence in refractive index, it is important to input the refractive index in consideration of this in the calculation of the theoretical correlation curve.

Next, the image processing unit 7 performs particle size distribution calculation and material discrimination by the same method as in step S240 (step S360). Specifically, the image processing unit 7 performs material discrimination based on the shortest distance between each measurement point plotted on the graph and the theoretical correlation curve corresponding to the predetermined material type and scattering angle (θth) drawn on the graph.

In addition, the image processing unit 7 is a theoretical correlation curve corresponding to the specified material, and calculates particle size at each measurement point based on the relationship of the scattered light intensity of each wavelength corresponding to the point on the theoretical correlation curve closest to each measurement point, the refractive index of such material, and the scattering angle.

Then, the image processing unit 7 calculates the particle size distribution for the particles of the specified material based on the number of measurement points and the specified particle size.

Further, when the image processing unit 7 calculates the material discrimination and the particle size distribution and ends the processing of this flow.

The imaging and the captured image analysis processing according to the present embodiment have been described above.

According to the particle measuring apparatus, particle size measurement and material discrimination can be performed simultaneously with a less expensive configuration. In particular, by using a scattered light image obtained by imaging scattered different for light with wavelengths even a sample of microparticles that cannot be detected as a shadow image, the particle measuring apparatus according to this embodiment can perform material discrimination and calculate the particle size distribution of the particles corresponding to each material.

As shown in FIGS. 12A to 12F, the theoretical correlation curves of sample A and sample B become more complicated in shape as the scattering angle increases, resulting in intersection points. It is difficult to perform material discrimination in the vicinity of such intersection points. Therefore, it is desirable to set the scattering angle such that such intersection points are minimized.

Further, in the present embodiment, an example has been described in which images are captured by switching between the first light source 1 and the third light source 12, but parallel light may be emitted simultaneously from these two light sources, may be separated into an R image and a B image in the imaging unit 5, and may capture an image of scattered light intensity corresponding to each wavelength. In this manner, images can be taken simultaneously without switching the light source, and thus the measurement time can be shortened.

In this embodiment, an example has been described in which the optical axes of the parallel light A and the parallel light C substantially match each other using the mirror 13 and the wavelength selection mirror 14, but, for example, a configuration in which the optical axes are deviated without using the mirror 13 may be employed. Also, the incident angles of the respective parallel light on the sample may be varied.

Third Embodiment

FIG. 14 is a diagram showing an example of a schematic configuration of the particle measuring apparatus 100 according to a third embodiment. The particle measuring apparatus 100 according to this embodiment is characterized in that the range of measurable particle sizes can be expanded. For example, in the second embodiment described above, even for microparticles that cannot be detected as shadow images similar to the first embodiment, the particle size can be measured by using scattered light images of parallel light with different wavelengths. On the other hand, in the captured image analysis processing according to the second embodiment, when the particle size increases, the theoretical correlation curves between the samples approach or intersect, and material discrimination may become difficult. Therefore, in the third embodiment, the particle measuring apparatus 100 capable of expanding the measurable range of particle size by using the captured image analysis processing according to the first embodiment and the second embodiment together will be described. It should be noted that the same components as those of the first embodiment and the second embodiment will be given the same reference numerals, and the repeating description thereof will be omitted.

As shown in the drawing, the particle measuring apparatus 100 according to the present embodiment includes the first light source 1 and the second light source 2 according to the first embodiment, and the third light source 12, the mirror 13, and the wavelength selection mirror 14 according to the second embodiment.

FIG. 15 is a flowchart showing an example of imaging and captured image analysis processing according to this embodiment.

When the processing is started, the particle measuring apparatus 100 irradiates the sample with the parallel light A from the first light source 1, and the imaging unit 5 captures a scattered light image scattered at a predetermined angle θth or less (S400). Further, similarly to step S200, the scattered light intensity processing unit 71 calculates the position (x1$i$, y1$i$) in the scattered light image and the scattered light intensity I1$i$ based on the luminance value for each particle i identified from the scattered light image (S410).

Next, the particle measuring apparatus 100 switches the light source via the control unit 8 and the light source switching unit 9, and irradiates the sample with the parallel light C from the third light source 12, and accordingly, the imaging unit 5 captures a scattered light image scattered at a predetermined scattering angle θ th or less (S420). Further, similarly to step S200, the scattered light intensity processing unit 71 calculates the position (x2$j$, y2$j$) in the scattered light image and the scattered light intensity I2$j$ based on the luminance value for each particle j identified from the scattered light image (S430).

Next, the particle measuring apparatus 100 switches the light source via the control unit 8 and the light source switching unit 9, and irradiates the sample with the parallel light B from the second light source 2, and accordingly, a shadow image of each particle is captured (S440). Further, similarly to step S210, the shadow size measuring processing unit 72 calculates the position (x3$k$, y3$k$) in the shadow image and the shadow size (shadow size) D3$k$ for each particle k identified from the shadow image (step S450).

Next, the image processing unit 7 specifies matching particles in each image by the same method as in step S220 (step S460).

Next, the image processing unit 7 assigns the scattered light intensity I1$i$, the scattered light intensity I2$j$, and the shadow size D3$k$ to each particle determined to be the same particle.

At this time, two types of particles, that is, particles having values of the scattered light intensity I1$i$, the scattered light intensity I2$j$, and the shadow size D3$k$, and particles having only values of the scattered light intensity I1$i$ and the scattered light intensity I2$j$, are obtained. The latter are particles that have a small particle size and could not be detected as shadow images.

Next, the image processing unit 7 plots measurement points, respectively, on a first graph with the scattered light intensity I1$i$ on the vertical axis and the scattered light intensity I2$j$ on the horizontal axis, and a second graph with the scattered light intensity I1$i$ on the vertical axis and the shadow size D3$k$ on the horizontal axis (S470).

Specifically, the image processing unit 7 generates a first graph plotting measurement points related to particles having only values of the scattered light intensity I1$i$ and the scattered light intensity I2$j$, that is, microparticles of which the shadow size is less than a predetermined threshold value, and a second graph plotting measurement points related to other particles, that is, particles of which the shadow size is equal to or greater than a predetermined threshold value. Also, at this time, the image processing unit 7 acquires the expected theoretical correlation curve of the predetermined sample from the storage unit 10, and draws the acquired theoretical correlation curve superimposes on these graphs.

It should be noted that there are a plurality of methods for setting the threshold value in step S470. For example, the first method is a method of setting a limit value at which the particle size can be recognized from the shadow image as a reference. In addition, another method is, for example, a method of performing setting using the particle size at which the difference between the scattered light intensity I1$i$ and the scattered light intensity I2$j$ is equal to or less than the resolution as a reference when the scattered light Intensity characteristics of the particles to be measured can be predicted in advance.

Next, as in the first embodiment and the second embodiment, the image processing unit 7 uses the first graph and the second graph to calculate the particle size distribution of the particles from each graph, and perform material discrimination (step S480). Further, when the image processing unit 7 calculates the material discrimination and the particle size distribution, the image processing unit 7 ends the processing of this flow.

The imaging and the captured image analysis processing according to the present embodiment have been described above.

According to the particle measuring apparatus 100, particle size measurement and material discrimination can be performed simultaneously with a less expensive configuration. In particular, the particle measuring apparatus can expand the range of measurable particle sizes by selecting an appropriate graph type according to the particle size.

Fourth Embodiment

FIG. 16 is a flowchart showing an example of refractive index estimation processing according to a fourth embodiment. The particle measuring apparatus 100 according to this embodiment is characterized in that it is possible to estimate the refractive index of a sample of which refractive index is unknown. The basic configuration of the particle measuring apparatus 100 is the same as that of the particle measuring apparatus 100 of the first embodiment.

When the processing is started, the particle measuring apparatus 100 performs the same processing as steps S200 to S220 of the first embodiment (step S600). The image processing unit 7 also plots the measurement points of each particle on a graph in which the vertical axis indicates the scattered light intensity and the horizontal axis indicates the shadow size (step S610).

Next, the image processing unit 7 estimates the refractive index of particles contained in the sample by searching for a theoretical correlation curve corresponding to the material type of the sample which was measured. Specifically, the image processing unit 7 sets the initial value of the refractive index (step S620), and creates a theoretical correlation curve on a graph plotting measurement points (on a graph in which the vertical axis indicates the scattered light intensity and the horizontal axis indicates the shadow size) (step S630).

The image processing unit 7 also calculates the error between each measurement point and the theoretical correlation curve based on the variance or standard deviation of the shortest distance between each measurement point and the generated theoretical correlation curve (step S640). Also, the image processing unit 7 determines whether or not the error is equal to or less than a predetermined threshold value (S650).

Then, when it is determined that the error is not equal to or less than the threshold value (No in step S650), the image processing unit 7 sequentially changes the set value of the refractive index (step S660), and returns the processing to step S630. On the other hand, when it is determined that the error is equal to or less than the threshold value (Yes in step S650), the image processing unit 7 estimates the set value as the refractive index corresponding to the material type of the measured sample (step S670). When the image processing unit 7 estimates the refractive index, the image processing unit 7 ends the processing of this flow.

The refractive index estimation processing according to the fourth embodiment has been described above.

According to such a particle measuring apparatus, it is possible to estimate the refractive index of particles in a sample having an unknown refractive index with a less expensive configuration.

It should be noted that the analysis processing of this embodiment may use the configuration of the particle measuring apparatus according to the second embodiment. In this case, when the refractive index at one wavelength of the parallel light is known, the refractive index corresponding to the other wavelength can be estimated with high accuracy.

In addition, in the above-described first to third embodiments, the image processing unit 7 may output a graph drawing both the measurement points and the theoretical correlation curve based on the Mie scattering theory, to the display connected to the particle measuring apparatus 100. In this manner, the user can refer to the graph showing the measurement status and visually confirm the distribution of each sample contained in the sample. In addition, for example, by drawing several representative particle sizes on the theoretical correlation curve, the user can more easily visualize the distribution state.

Moreover, the present invention is not limited to the above-described embodiments and modification examples, and includes various modification examples within the scope of the same technical idea. For example, the above-described examples have been described in detail in order to make it easy to understand the present invention, and are not necessarily limited to those having all the described configurations. In addition, it is possible to replace part of the configuration of a certain example with the configuration of another example, and it is also possible to add the configuration of another example to the configuration of a certain example. Moreover, it is possible to add, delete, or replace a part of the configuration of each example with another configuration.

Moreover, in the above description, the control lines and information lines are those considered to be necessary for the description, and not all the control lines and information lines are necessarily shown on the product. In reality, it can be considered that almost all configurations are interconnected.

REFERENCE SIGNS LIST

100: particle measuring apparatus
1: first light source
2: second light source
3: measuring unit
4: microscope
5: imaging unit
6: light shielding plate
7: image processing unit
71: scattered light intensity processing unit
72: shadow size measuring processing unit
8: control unit
9: light source switching unit
10: storage unit
11: communication unit
110: arithmetic device
120: main storage device
130: auxiliary storage device
140: communication device
150: bus
N: network

The invention claimed is:

1. A particle measuring apparatus comprising:
a first light source and a second light source that irradiate a sample containing particles of a predetermined material with respective beams of collimated (parallel) light;
an imaging assembly including objective optics and a solid-state image sensor configured to capture (i) a scattered light image of the particles produced by the collimated light emitted from the first light source and (ii) a shadow image of the particles produced by the collimated light emitted from the second light source; and
one or more processors collectively configured to:
(a) detect individual particles in the scattered light image and calculate, for each detected particle, a scattered-light intensity;
(b) detect the same individual particles in the shadow image and calculate, for each detected particle, a shadow size;
(c) generate, for matched particles, a dataset indicating correspondence between the per-particle scattered-light intensities and the per-particle shadow sizes;
(d) generate a theoretical correlation curve family representing theoretical correspondences between scattered-light intensity and shadow size for a plurality of candidate refractive indices of a candidate set of particle materials in accordance with Mie scattering;
(e) estimate an unknown refractive index by selecting, from the family, a curve that minimizes an aggregated distance between the dataset and the curve subject to an error threshold; and
(f) perform material discrimination by associating the estimated refractive index with a material of the candidate set and calculate a particle size for the particles.

2. The particle measuring apparatus of claim 1, wherein the one or more processors are collectively configured to compute, for each particle, a distance between a measurement point of the dataset and each theoretical correlation curve, aggregate distances over the particles using a metric selected from Euclidean, weighted least-squares, or Mahalanobis distance, and perform material discrimination based on the aggregated distance, while calculating the particle size from the shadow size and/or the scattered light intensity.

3. The particle measuring apparatus of claim 1, wherein an illumination geometry of the from the first light source relative to the imaging assembly is set such that scattered light from the particles at a predetermined scattering angle or less is received by the imaging assembly.

4. The particle measuring apparatus of claim 1, further comprising:
an angle adjuster configured to adjust an irradiation angle of the collimated light emitted from the first light source, the angle adjuster comprising at least one of: a motor-driven rotary stage positioning the first light source about the sample; a galvanometric mirror assembly in an illumination path of the first light source; or a refractive beam-steering element.

5. A particle measuring apparatus comprising:
a first light source and a second light source that irradiate a sample containing particles of a predetermined material with collimated light of mutually different wavelengths;
an imaging assembly including objective optics and a solid-state image sensor configured to capture a first scattered-light image of the particles produced by the collimated light of a first wavelength emitted from the first light source and a second scattered-light image of the particles produced by the collimated light of a second wavelength emitted from the second light source; and one or more processors collectively configured to:

(a) compute, per particle, first and second scattered light intensities from the respective images and generate per-particle correspondence between the first and second intensities;

(b) generate a theoretical correlation curve family representing theoretical correspondences between the first and second intensities for a plurality of candidate refractive indices in accordance with Mie scattering;

(c) estimate an unknown refractive index by selecting, from the family, a curve that minimizes an aggregated distance to the per-particle correspondence subject to an error threshold; and (d) perform material discrimination based on the estimated refractive index and calculate a particle size of the particles.

6. The particle measuring apparatus of claim 5, wherein the imaging assembly captures the scattered light image for each of the first and second wavelengths during simultaneous emission from the first and second light sources, and includes wavelength-selective optics comprising at least one of a dichroic beam splitter, an interference filter, or a color-separating filter array to separate signals by wavelength.

7. The particle measuring apparatus of claim 5, further comprising:

a third light source that irradiates the sample with collimated light, wherein the imaging assembly captures a shadow image of the particles produced by the collimated light emitted from the third light source, and wherein the one or more processors are collectively configured such that: for particles having a particle size less than a predetermined value, material discrimination and particle size calculation are performed using the first scattered-light image and the second scattered-light image; and for particles having a particle size equal to or greater than the predetermined value, material discrimination and particle-size calculation are performed using at least one of the first scattered light image and the shadow image.

8. The particle measuring apparatus of claim 1, further comprising:

a linear actuator arranged to translate an irradiation window member along an optical axis of the collimated light irradiated by the second light source to inhibit flow of the sample in a sample container, the irradiation window member comprising a window on which collimated light from the first light source and from the second light source is incident.

9. The particle measuring apparatus of claim 1, further comprising:

a valve coupled to the sample container and configured to control injection and ejection of the sample, the valve being operable to inhibit movement of the particles by controlling flow of the sample in the sample container.

10. The particle measuring apparatus of claim 1, further comprising a cleaning system comprising a reservoir, a pump, and at least one nozzle oriented toward a pair of windows through which the collimated light from the first and second light sources is transmitted, the pump being operable to discharge a cleaning liquid toward sample material attached to the windows.

11. The particle measuring apparatus of claim 1, wherein the theoretical correlation curve family is generated based on Mie scattering theory using refractive index as an input parameter.

12. A particle measuring method, comprising:

irradiating a sample containing particles of a predetermined material with collimated light from a first light source and with collimated light from a second light source;

capturing, with an imaging assembly including objective optics and a solid-state image sensor, a scattered light image produced by the collimated light emitted from the first light source and a shadow image produced by the collimated light emitted from the second light source; and executing, by one or more processors, operations that include: detecting individual particles and calculating per-particle scattered light intensity and per-particle shadow size; generating a correspondence dataset between the intensities and shadow sizes; generating a theoretical correlation curve family for multiple candidate refractive indices, estimating an unknown refractive index by selecting a best-fit curve via aggregated distance subject to an error threshold; and outputting material discrimination and a particle size of the particles.

13. A particle measuring method, comprising:

irradiating a sample containing particles of the predetermined material with collimated light of mutually different wavelengths from a first light source and a second light source;

capturing a first scattered light image produced by the collimated light of a first wavelength emitted from the first light source and a second scattered light image produced by the collimated light of a second wavelength emitted from the second light source; and executing, by one or more processors, operations that include: calculating per-particle first scattered-light intensities from the first scatter light image and per-particle second scattered-light intensities from the second scattered light image; generating per-particle correspondence between the first and second intensities; generating a theoretical correlation curve family for multiple candidate refractive indices; estimating an unknown refractive index by selecting a best-fit curve via aggregated distance subject to an error threshold; and outputting material discrimination and a particle size of the particles.

14. The method of claim 13, wherein the irradiating includes irradiating the sample collimated light from a third light source, the capturing includes capturing a shadow image produced by the collimated light emitted from the third light source, and the executing includes: for particles having a particle size less than a predetermined value, performing material discrimination using the first scattered light image and the second scattered light image and calculating the particle size; and for particles having a particle size equal to or greater than the predetermined value, performing material discrimination using at least one of the first scattered light image and the shadow image and calculating the particle size.

15. The method of claim 12, wherein
computing the aggregated distance includes Euclidean, weighted least-squares, or Mahalanobis distance.

16. The particle measuring apparatus of claim 1, wherein the one or more processors are collectively configured to capture the scattered-light image and the shadow image while sample flow is inhibited, the apparatus further comprising a valve and an irradiation-window member movable along an optical axis, and wherein the flow is inhibited by closing the valve and translating the irradiation-window member prior to image capture.

17. The particle measuring apparatus of claim 1, wherein the one or more processors are collectively configured to compare an aggregated distance between the correspondence dataset and each theoretical correlation curve to a predetermined error threshold, and output an "undetermined material" result when the aggregated distance for all curves exceeds the threshold.

18. The particle measuring apparatus of claim 6, wherein the imaging assembly comprises a color image sensor having a color-separating filter array, and the first scattered-light image and the second scattered-light image at the first and second wavelengths are captured under simultaneous illumination and separated by the filter array.

19. The particle measuring method of claim 12, further comprising, before the capturing, performing a cleaning cycle that includes discharging a cleaning liquid toward a pair of windows through which the collimated light is transmitted and translating an irradiation-window member along the optical axis while closing a valve to inhibit sample flow.

20. The particle measuring apparatus of claim 1, wherein the one or more processors are collectively configured to access a precomputed family of theoretical correlation curves generated in accordance with Mie scattering theory for a plurality of candidate refractive indices stored in memory, and to select from the precomputed family a curve that minimizes the aggregated distance to the correspondence dataset.

* * * * *